(12) United States Patent
Takesue

(10) Patent No.: US 11,601,569 B2
(45) Date of Patent: Mar. 7, 2023

(54) IMAGE PROCESSING DEVICE, IMAGE FORMING SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Naoya Takesue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/668,409

(22) Filed: Feb. 10, 2022

(65) Prior Publication Data

US 2022/0272231 A1    Aug. 25, 2022

(30) Foreign Application Priority Data

Feb. 24, 2021  (JP) .............................. JP2021-027744

(51) Int. Cl.
*H04N 1/60*      (2006.01)
*H04N 1/405*     (2006.01)

(52) U.S. Cl.
CPC ............... *H04N 1/60* (2013.01); *H04N 1/405* (2013.01)

(58) Field of Classification Search
CPC ......... H04N 1/60; H04N 1/405; H04N 1/6036
See application file for complete search history.

(56) References Cited

U.S. PATENT DOCUMENTS

| 8,659,791 B2* | 2/2014 | Torigoe ................... H04N 1/60 |
| | | 358/1.9 |
| 10,187,553 B2* | 1/2019 | Takesue ................ H04N 1/605 |
| 10,205,854 B2 | 2/2019 | Shimada et al. |
| 10,264,156 B2* | 4/2019 | Eiyama ................ H04N 1/2323 |
| 10,733,488 B2 | 8/2020 | Takesue et al. |
| 10,855,877 B2 | 12/2020 | Takesue et al. |
| 11,321,596 B2 | 5/2022 | Takesue et al. |
| 2004/0090640 A1* | 5/2004 | Nino .................... H04N 1/6016 |
| | | 358/1.9 |
| 2005/0111017 A1* | 5/2005 | Takahashi ............ H04N 1/6027 |
| | | 358/1.9 |
| 2015/0054874 A1* | 2/2015 | Yanai ...................... H04N 1/54 |
| | | 347/14 |
| 2018/0063381 A1* | 3/2018 | Takesue ................. H04N 1/603 |

(Continued)

FOREIGN PATENT DOCUMENTS

| EP | 4057607 A1 * | 9/2022 | ............ G01J 3/0254 |
| JP | 2012-155309 A | 8/2012 | |

(Continued)

*Primary Examiner* — Ted W Barnes
(74) *Attorney, Agent, or Firm* — Carter, DeLuca & Farrell LLP

(57) ABSTRACT

There is provided with an image processing device. An obtaining unit is configured to obtain a mixed spectral reflectance of a region in which a first color and a second color are mixed in an image including the first color and the second color, a plurality of first spectral reflectances of the first color, a plurality of first halftone dots associated with respective ones of the plurality of first spectral reflectances, a plurality of second spectral reflectances of the second color, and a plurality of second halftone dots associated with respective ones of the plurality of second spectral reflectances.

11 Claims, 21 Drawing Sheets

(56) References Cited

U.S. PATENT DOCUMENTS

| | | | |
|---|---|---|---|
| 2018/0324327 A1* | 11/2018 | Moribe | H04N 1/6019 |
| 2019/0124231 A1* | 4/2019 | Takesue | H04N 1/52 |
| 2021/0160400 A1* | 5/2021 | Hayashi | H04N 1/00045 |
| 2021/0303950 A1 | 9/2021 | Takesue et al. | |
| 2021/0303952 A1 | 9/2021 | Takesue et al. | |
| 2022/0174185 A1* | 6/2022 | Takamizawa | H04N 1/6033 |
| 2022/0222498 A1 | 7/2022 | Takesue et al. | |
| 2022/0256057 A1* | 8/2022 | Kawai | H04N 1/6008 |
| 2022/0272232 A1* | 8/2022 | Muramoto | H04N 1/6027 |

FOREIGN PATENT DOCUMENTS

| | | | | |
|---|---|---|---|---|
| JP | 2019016924 A | * | 1/2019 | |
| JP | 6926744 B2 | * | 8/2021 | |
| JP | 2022121956 A | * | 8/2022 | H04N 1/6008 |

* cited by examiner

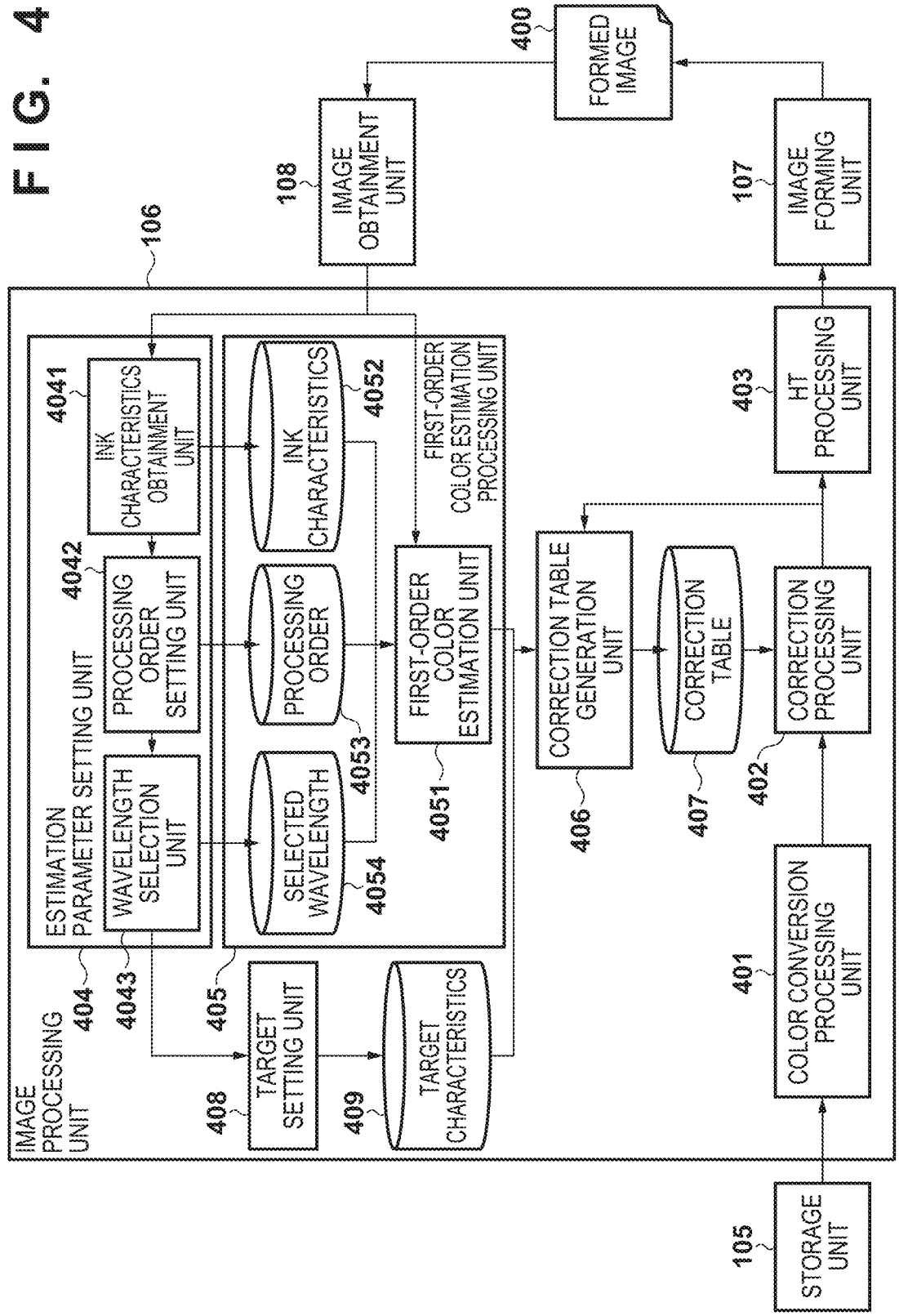

FIG. 5

| INPUT COLOR SIGNAL | RECORDING HEAD 201 | | | RECORDING HEAD 202 | | | RECORDING HEAD 203 | | | RECORDING HEAD 204 | | |
|---|---|---|---|---|---|---|---|---|---|---|---|---|
| | 201a | 201b | 201c | 202a | 202b | 202c | 203a | 203b | 203c | 204a | 204b | 204c |
| 0 | 0 | 0 | 0 | 0 | 0 | 0 | 0 | 0 | 0 | 0 | 0 | 0 |
| 16 | 14 | 16 | 20 | 15 | 16 | 12 | 10 | 16 | 13 | 22 | 16 | 15 |
| 32 | 28 | 32 | 39 | 31 | 32 | 25 | 20 | 32 | 26 | 46 | 32 | 30 |
| ... | ... | ... | ... | ... | ... | ... | ... | ... | ... | ... | ... | ... |
| 240 | 221 | 240 | 255 | 238 | 240 | 185 | 148 | 240 | 197 | 255 | 240 | 232 |
| 255 | 236 | 255 | 255 | 250 | 255 | 202 | 159 | 255 | 211 | 255 | 255 | 252 |

FIG. 9

|   | 380-430 | 430-480 | 480-530 | 530-580 | 580-630 | 630-680 | 680-730 |
|---|---------|---------|---------|---------|---------|---------|---------|
| C | × | △ | △ | × | × | × | × |
| M | × | × | × | × | △ | ○ | ○ |
| Y | × | × | △ | ○ | ○ | ○ | ○ |

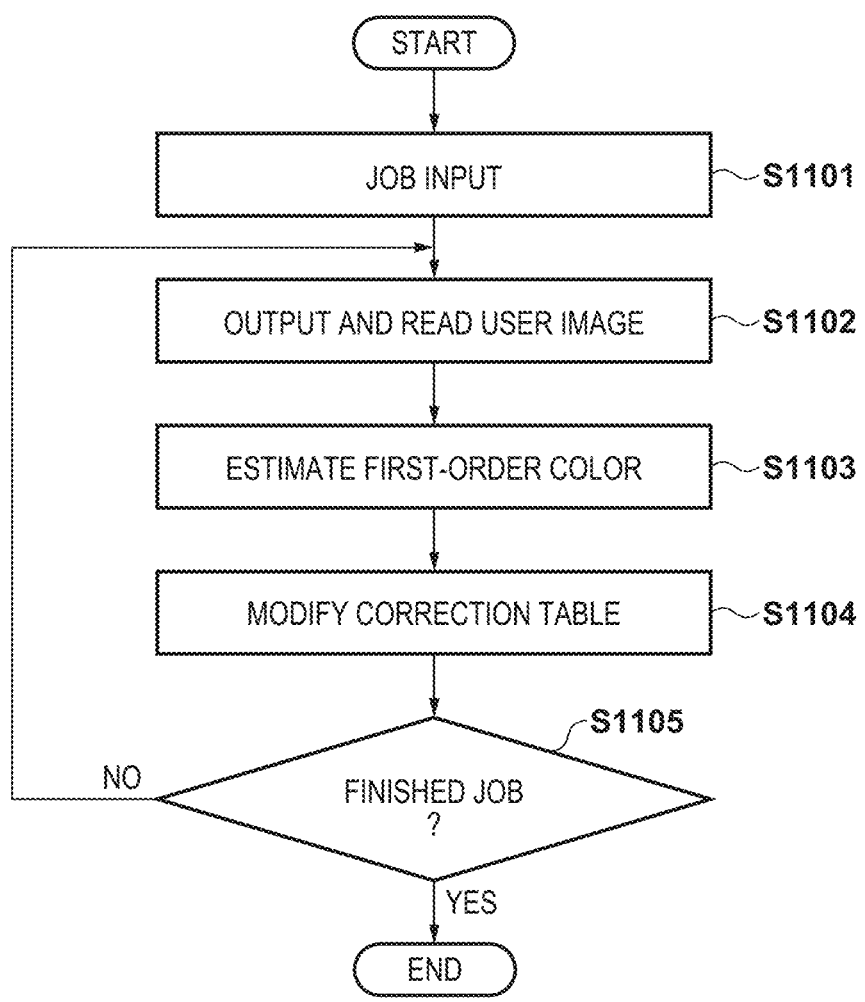

|   | 380-430 | 430-480 | 480-530 | 530-580 | 630-680 | 680-730 |
|---|---|---|---|---|---|---|
| C | × | ○ | ○ | × | × | × |
| M | × | × | × | × | ○ | ○ |
| Y | × | × | ○ | ○ | ○ | ○ |
| K | × | × | × | × | × | × |

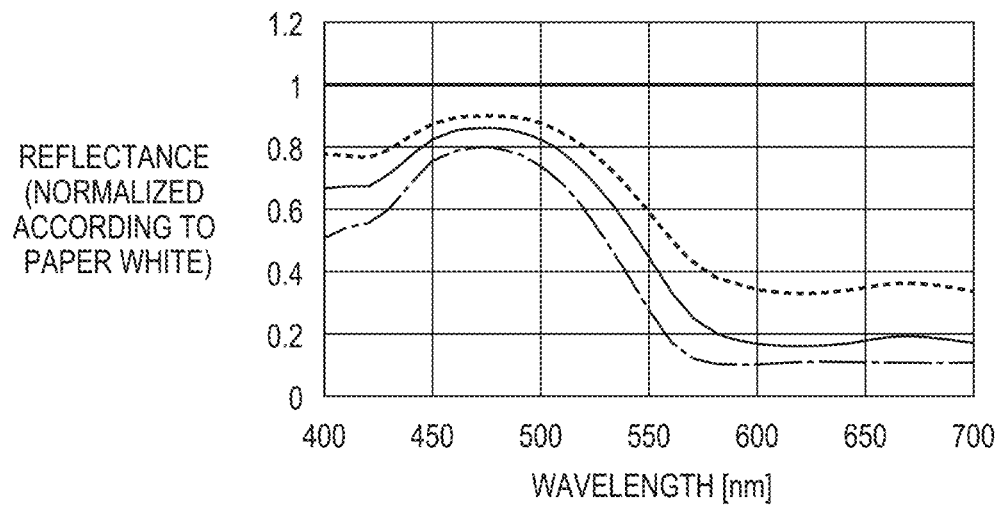
F I G. 15A
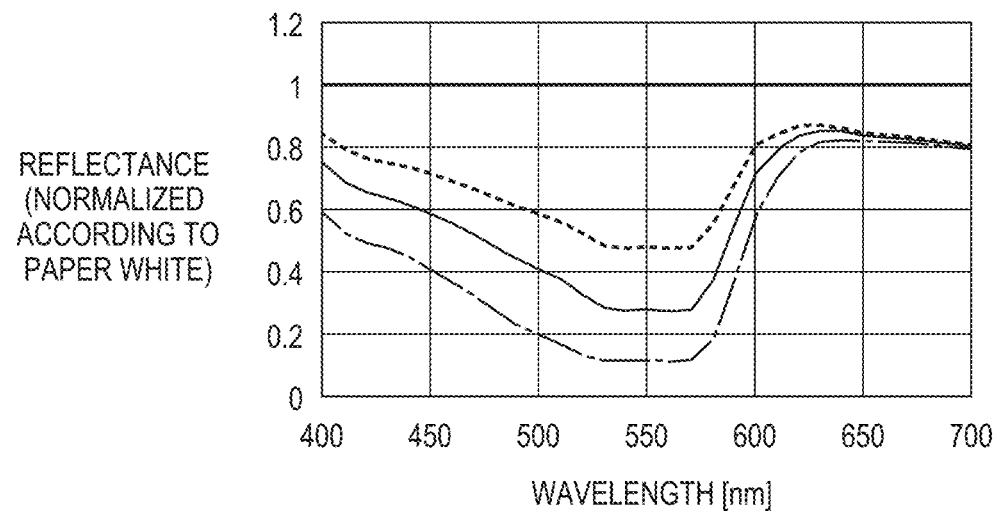
F I G. 15B

F I G. 19A
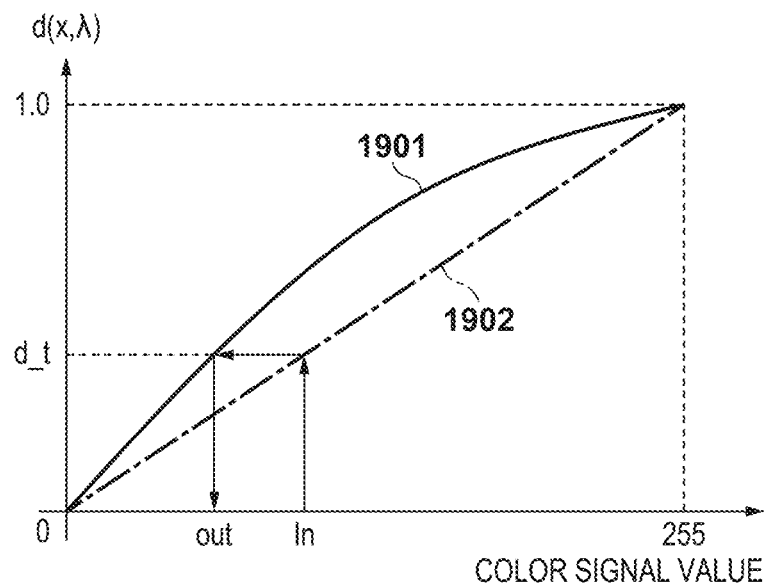
F I G. 19B
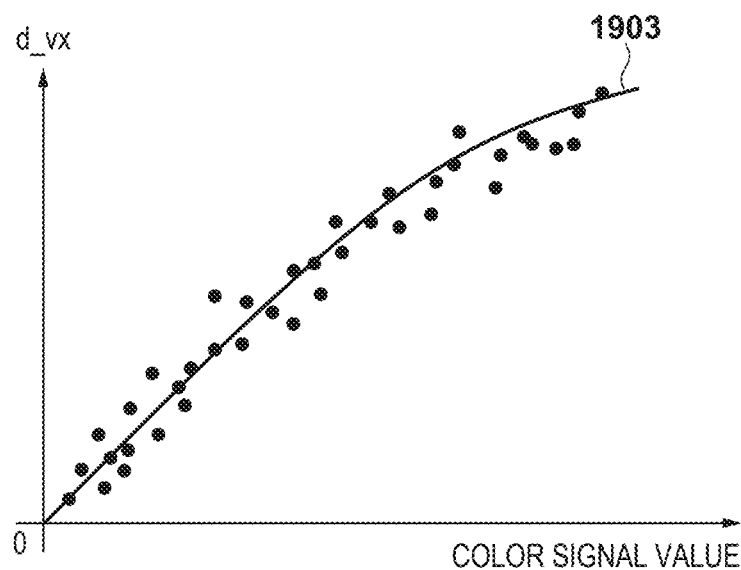

IMAGE PROCESSING DEVICE, IMAGE FORMING SYSTEM, IMAGE PROCESSING METHOD, AND NON-TRANSITORY COMPUTER-READABLE STORAGE MEDIUM

BACKGROUND OF THE INVENTION

Field of the Invention

The present invention relates to an image processing device, an image forming system, an image processing method, and a non-transitory computer-readable storage medium.

Description of the Related Art

Ink jet printers, which form images by ejecting ink from a plurality of nozzles, are widely used as image forming devices for forming desired images on paper. Printers using the electrophotographic method, which uses a laser photosensitive member and charged toner to form images, are also widely used. It is known that in electrophotographic printers, the color of a formed image changes depending on the environment, such as the amount of toner remaining in the image forming device, the ambient temperature and humidity, and the like. On the other hand, it is known that in ink jet printers, the color changes due to factors such as ink adhering around the nozzles, aging of the piezoelectric elements and heaters that control ink ejection, and the surrounding environment such as temperature and humidity. To address the problem of color changes caused by factors such as the environment around the printer, there is a technique that suppresses color changes by executing image color stabilization processing at regular intervals, for example.

The stabilization processing requires that a dedicated color chart be output to measure the characteristics of each color of recording material, such as toner or ink. However, outputting a dedicated color chart consumes the recording material, paper, and time spent by the user to output images, which results in an unnecessary increase in costs. The user may increase the output interval of the dedicated color chart to suppress the increase in costs involved with outputting the dedicated color chart, but doing so may make it impossible to sufficiently measure the characteristics of the recording material of the printer, thus causing a drop in the accuracy of color stabilization. Against this background, a technique that maintains the accuracy of color stabilization while avoiding an unnecessary increase in costs by performing color stabilization processing on the basis of a color measurement result of a printed user image has been disclosed (Japanese Patent Laid-Open No. 2012-155309).

SUMMARY OF THE INVENTION

The present invention in its one aspect provides an image processing device comprising an obtaining unit configured to obtain a mixed spectral reflectance of a region in which a first color and a second color are mixed in an image including the first color and the second color, a plurality of first spectral reflectances of the first color, a plurality of first halftone dots associated with respective ones of the plurality of first spectral reflectances, a plurality of second spectral reflectances of the second color, and a plurality of second halftone dots associated with respective ones of the plurality of second spectral reflectances, a determining unit configured to determine a first wavelength range in which the plurality of first spectral reflectances are lower than the plurality of second spectral reflectances and a second wavelength range in which the plurality of first spectral reflectances are higher than the plurality of second spectral reflectances, an estimation unit configured to estimate a first halftone dot associated with one first spectral reflectance, selected from the plurality of first spectral reflectances, in accordance with a matching rate with the mixed spectral reflectance in the first wavelength range, find a third spectral reflectance by dividing the mixed spectral reflectance by the first spectral reflectance selected, and estimate a second halftone dot associated with one second spectral reflectance, selected from the plurality of second spectral reflectances, in accordance with a matching rate with the third spectral reflectance in the second wavelength range, and a correcting unit configured to correct the first halftone dot and the second halftone dot of the first color and the second color, respectively, on the basis of a difference between a pre-set target for the first halftone dot and the second halftone dot and the first halftone dot and the second halftone dot estimated by the estimation unit, respectively.

The present invention in its one aspect provides an image processing method comprising obtaining a mixed spectral reflectance of a region in which a first color and a second color are mixed in an image including the first color and the second color, a plurality of first spectral reflectances of the first color, a plurality of first halftone dots associated with respective ones of the plurality of first spectral reflectances, a plurality of second spectral reflectances of the second color, and a plurality of second halftone dots associated with respective ones of the plurality of second spectral reflectances, determining a first wavelength range in which the plurality of first spectral reflectances are lower than the plurality of second spectral reflectances and a second wavelength range in which the plurality of first spectral reflectances are higher than the plurality of second spectral reflectances, estimating a first halftone dot associated with one first spectral reflectance, selected from the plurality of first spectral reflectances, in accordance with a matching rate with the mixed spectral reflectance in the first wavelength range, find a third spectral reflectance by dividing the mixed spectral reflectance by the first spectral reflectance selected, and estimate a second halftone dot associated with one second spectral reflectance, selected from the plurality of second spectral reflectances, in accordance with a matching rate with the third spectral reflectance in the second wavelength range, and correcting the first halftone dot and the second halftone dot of the first color and the second color, respectively, on the basis of a difference between a pre-set target for the first halftone dot and the second halftone dot and the first halftone dot and the second halftone dot estimated by the estimating, respectively.

The present invention in its one aspect provides a non-transitory computer-readable storage medium storing a program that, when executed by a computer, causes the computer to perform an image processing method, the non-transitory computer-readable storage medium comprising obtaining a mixed spectral reflectance of a region in which a first color and a second color are mixed in an image including the first color and the second color, a plurality of first spectral reflectances of the first color, a plurality of first halftone dots associated with respective ones of the plurality of first spectral reflectances, a plurality of second spectral reflectances of the second color, and a plurality of second halftone dots associated with respective ones of the plurality of second spectral reflectances, determining a first wavelength range in which the plurality of first spectral reflectances are lower than the plurality of second spectral reflectances and a second wavelength range in which the plurality of first spectral reflectances are higher than the plurality of second spectral reflectances, estimating a first halftone dot associated with one first spectral reflectance, selected from the plurality of first spectral reflectances, in accordance with a matching rate with the mixed spectral reflectance in the first wavelength range, find a third spectral reflectance by dividing the mixed spectral reflectance by the first spectral reflectance selected, and estimate a second halftone dot associated with one second spectral reflectance, selected from the plurality of second spectral reflectances, in accordance with a matching rate with the third spectral reflectance in the second wavelength range, and correcting the first halftone dot and the second halftone dot of the first color and the second color, respectively, on the basis of a difference between a pre-set target for the first halftone dot and the second halftone dot and the first halftone dot and the second halftone dot estimated by the estimating, respectively.

Further features of the present invention will become apparent from the following description of exemplary embodiments (with reference to the attached drawings).

BRIEF DESCRIPTION OF THE DRAWINGS

FIG. 4 is a function block diagram illustrating an image processing unit according to embodiments of the present invention.

FIG. 5 is a diagram illustrating an example of a correction table according to embodiments of the present invention.

FIG. 9 is a diagram illustrating an example of a first-order color spectral reflectance classification table according to the first embodiment.

FIG. 11 is a flowchart illustrating image printing processing by a user according to the first embodiment.

FIG. 15A is a diagram illustrating first-order color estimation processing according to a second embodiment.

FIG. 15B is a diagram illustrating first-order color estimation processing according to the second embodiment.

FIG. 19A is a diagram illustrating a relationship between color signal value and spectral density according to the second embodiment.

FIG. 19B is a diagram illustrating a relationship between color signal value and spectral density according to the second embodiment.

DESCRIPTION OF THE EMBODIMENTS

Figure 1:
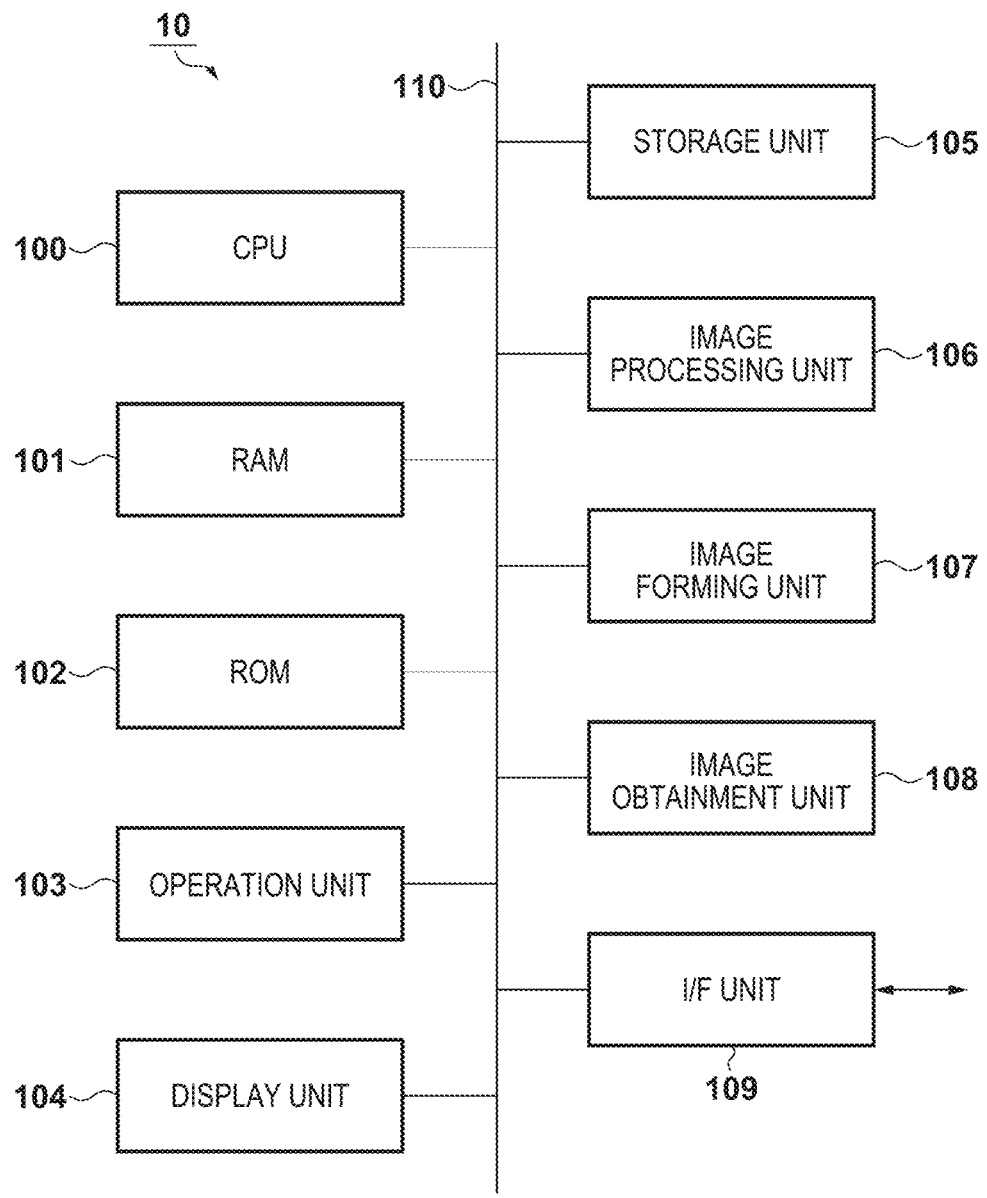
FIG. 1 is a block diagram illustrating an image forming system according to embodiments of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

One embodiment of the present invention makes it possible to shorten estimation time for estimating a recording amount for each of colors in an image constituted by a plurality of colors, and improve the accuracy of color stabilization processing.

First Embodiment

An image forming system 10 according to the present embodiment will be described hereinafter.

FIG. 1 is a diagram illustrating an example of the configuration of the image forming system 10 according to the present embodiment. The image forming system according to the present embodiment is configured including a CPU 100, RAM 101, ROM 102, an operation unit 103, a display unit 104, a storage unit 105, an image processing unit 106, an image forming unit 107, an image obtainment unit 108, an I/F unit 109, and a bus 110.

The CPU 100 is a processor which is a central processing arithmetic unit, and controls the operations of the image forming system 10 as a whole by executing computer programs stored in the RAM and ROM, which will be described later. Although a case where the CPU 100 controls the image forming system 10 as a whole will be described as an example, a plurality of pieces of hardware (not shown) may control the image forming system 10 as a whole by sharing processing. The RAM 101 is main memory for work and has a storage area for temporarily storing computer programs and data read from the storage unit 105 and data received from outside via the I/F unit 109. The RAM 101 is also used as a storage area used when the CPU 100 executes various types of processing and when the image processing unit 106 executes image processing. The ROM 102 is a readable memory and has a storage area that stores setting parameters for each of the units in the image forming system 10, a boot program, and the like.

The operation unit 103 is an input device such as a keyboard, a mouse, and the like, and receives operations or instructions from a user. This makes it possible for the user to issues various types of instructions to the CPU 100. The display unit 104 is a display device such as a cathode ray tube (CRT) or liquid crystal display (LCD), and can display results of processing by the CPU 100 as images, text, and the like. If the display unit 104 is equipped with a touch panel that can be operated by touch, the display unit 104 may function as a part of the operation unit 103. The storage unit 105 is a large-capacity information storage device, such as a hard disk drive (HDD), for example. The storage unit 105 stores an operating system (OS), computer programs and data for the CPU 100 to execute various types of processing, and the like. The storage unit 105 also holds temporary data generated by the processing of each unit in the image forming system 10 (e.g., image data to be input or output, conversion matrices used by the image processing unit 106, and the like). The computer programs and data stored in the storage unit 105 are read as appropriate under the control of the CPU 100 and stored in the RAM 101.

The image processing unit 106 is a processor and dedicated image processing circuitry capable of executing computer programs. The image processing unit 106 performs various types of image processing for converting image data input as a subject for printing into image data that can be output by the image forming unit 107 (described later). The image processing unit 106 can also perform color stabilization processing based on the results of reading an image printed by the user. Note that in the present embodiment, instead of preparing a dedicated processor as the image processing unit 106, the CPU 100 may perform various types of image processing instead of the image processing unit 106. The image forming unit 107 has a function for forming an image by ejecting a recording material in a recording head onto a recording medium. The image forming unit 107 forms an image by ejecting the recording material onto the recording medium on the basis of image data received via the image processing unit 106 or the RAM 101 and an external recording device (not shown). The recording medium is, for example, standard paper, coated paper, and glossy paper. The recording material is, for example, pigment ink or dye ink including cyan (C), magenta (M), yellow (Y), and black (K). The image forming unit 107 will be described in detail later.

The image obtainment unit 108 includes an image sensor (e.g., a line sensor or an area sensor) for capturing a recorded image formed on the recording medium by the image forming unit 107. Note that in the present embodiment, the image sensor is a spectral sensor capable of obtaining a reflectance at each of wavelengths on the basis of reflected light from the image formed on the recording medium. "Spectral reflectance" refers to a distribution of the reflectance for each wavelength. Note that the spectral density is obtained by converting the inverse of the spectral reflectance using a common logarithm. Additionally, the image sensor is an RGB sensor that detects signal information of the three primary colors, namely R (red), G (green), and B (blue), from the reflected light from the image formed on the recording medium.

The I/F unit 109 functions as an interface for connecting the image forming system 10 to an external device (not shown). The I/F unit 109 also functions as an interface for exchanging data with another communication device (not shown) and as an interface for connecting to the Internet through infrared communication, wireless LAN (local area network), or the like. The bus 110 is a data transmission channel for exchanging data among the various units in the image forming system 10. All the units in the image forming system 10 are connected to the bus 110, and for example, the CPU 100 can transfer data to and from the ROM 102 over the bus 110.

Figure 2A:
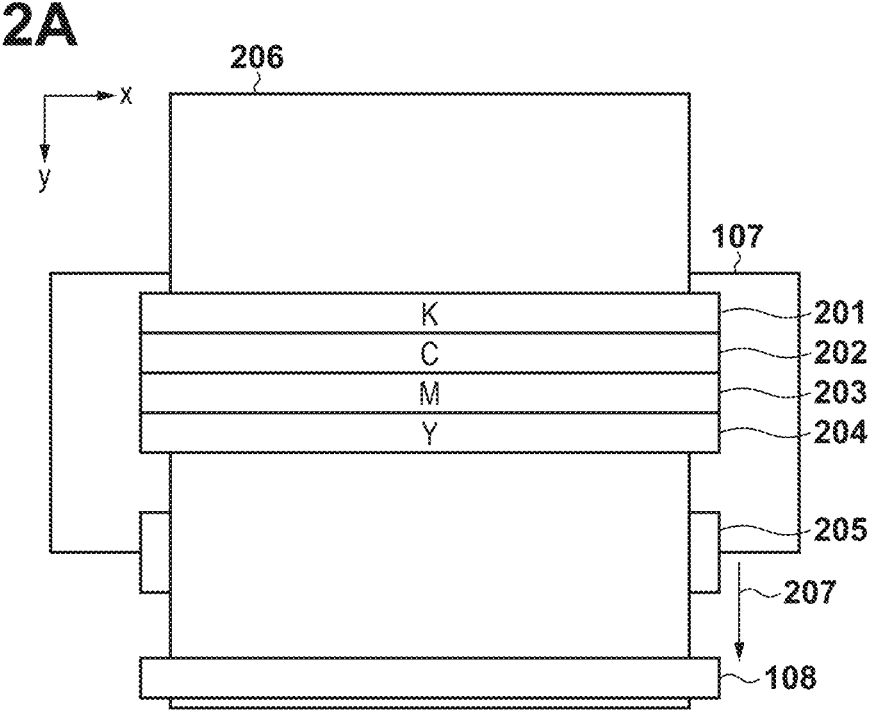
FIG. 2A is a schematic diagram illustrating an image forming unit and an image obtainment unit according to embodiments of the present invention.

FIGS. 2A to 2D schematically illustrate the image forming unit 107 according to the present embodiment. The image forming unit 107 in the present embodiment is an ink jet printer that forms images by ejecting the recording material (e.g., ink) from a nozzle onto the recording medium. As illustrated in FIG. 2A, the image forming unit 107 includes a recording head 201, a recording head 202, a recording head 203, and a recording head 204 on a frame (not shown) serving as a structural member of the printer. The recording heads 201 to 204 have black (K), cyan (C), magenta (M), and yellow (Y) ink, respectively. In FIG. 2A, for example, the recording head 201 has black (K) ink, and the recording head 202 has cyan (C) ink. The recording head 203 has magenta (M), and the recording head 204 has yellow (Y).

The recording heads 201 to 204 are full-line type recording heads, for example, in which a plurality of nozzles for ejecting ink are arranged in a predetermined direction within a range corresponding to the width of recording paper 206. A full-line type recording head is the same length as the recording paper 206, and thus a broad area of the recording paper 206 can be printed on at once, making it possible to accelerate the printing. Note, however, that the image forming unit 107 is not limited to a full-line type recording head, and may instead be a serial type which, for example, records the recording material by causing the recording head to scan while reciprocating in a direction 90° orthogonal to a paper transport direction 207 of the recording paper 206. Alternatively, the image forming unit 107 may be an electrophotographic type that uses a laser photosensitive member and charged toner to form an image, or a thermal transfer type that vaporizes solid ink using heat and transfers the ink to print paper.

Figure 2B:
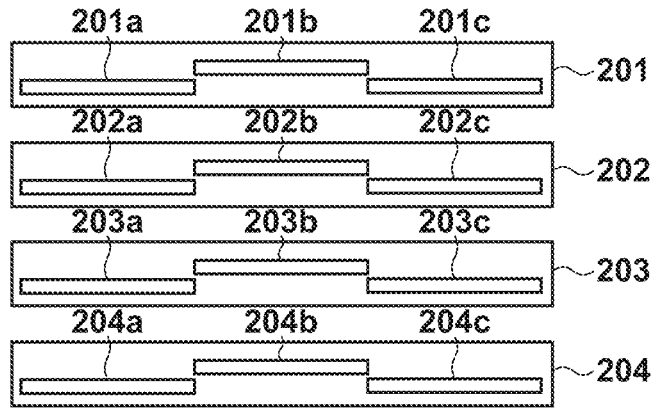
FIG. 2B is a schematic diagram illustrating the image forming unit and the image obtainment unit according to embodiments of the present invention.
Figure 2C:
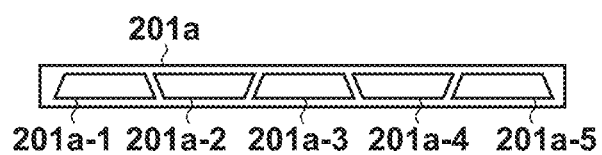
FIG. 2C is a schematic diagram illustrating the image forming unit and the image obtainment unit according to embodiments of the present invention.

As illustrated in FIG. 2B, the recording heads 201 to 204 are configured by combining a plurality of head modules. For example, the recording head 201 includes a head module 201a, a head module 201b, and a head module 201c. The head module 201a to the head module 201c are in a staggered arrangement, for example, with adjacent head modules alternatingly disposed forward and backward relative to the paper transport direction 207. Furthermore, as illustrated in FIG. 2C, for example, the head module 201a includes a chip module 201a-1, a chip module 201a-2, a chip module 201a-3, a chip module 201a-4, and a chip module 201a-5. The chip modules 201a-1 to 201a-5 are connected independently to a base of the head module 201a. The head modules aside from the head module 201a have the same configuration as the head module 201a and will therefore not be described.

Figure 2D:
FIG. 2D is a schematic diagram illustrating the image forming unit and the image obtainment unit according to embodiments of the present invention.

FIG. 2D is a diagram illustrating one of the stated chip modules from an ink ejection side, and illustrates the chip module as having a plurality of nozzles. The plurality of nozzles are the parts indicated by circles. In the example illustrated in FIG. 2D, the chip module has 16 nozzles. The resolution of the nozzle array in the nozzle row for each ink color is, for example, 1,200 dpi. The recording paper 206 serving as the recording medium is transported in the paper transport direction 207 by a transport roller 205 (and other rollers not illustrated here) rotating under the driving force of a motor (not shown). Next, while the recording paper 206 is being transported, the plurality of nozzles in each of the recording heads 201 to 204 eject an appropriate amount of ink of each ink color according to recording data. Through this, one raster's worth of an image (e.g., one horizontal row of pixels, the pixel being the smallest unit of an image), corresponding to the nozzle row of each recording head, is formed sequentially. By repeatedly ejecting ink from each recording head onto the transported recording paper 206, one page's worth of an image can be recorded, for example.

Additionally, as illustrated in FIG. 2A, the image obtainment unit 108 is a line sensor that is disposed downstream from the recording heads 201 to 204 in the paper transport direction 207, and that covers the entire surface of the recording paper 206. A "line sensor" is an image sensor capable of obtaining a two-dimensional image by continuously obtaining one line's worth of a one-dimensional image. The image obtainment unit 108 sequentially obtains information on the spectral reflectance of the recording paper 206 transported after images have been formed thereon by the recording heads 201 to 204. The image obtainment unit 108 also stores the obtained spectral reflectance information as two-dimensional spectral image data in the storage unit 105. The resolution in a wavelength λ direction by the image obtainment unit 108 according to the present embodiment is 10 nm. The image obtainment unit 108 is not limited to a line sensor such as that illustrated in FIG. 2A. The image obtainment unit 108 may, for example, include a carriage that moves back and forth in a direction 90° orthogonal to the paper transport direction 207 of the recording paper 206. The image obtainment unit 108 may be configured to obtain information on the spectral reflectance of any image region having a width smaller than the recording paper 206 using the carriage.

Image color stabilization processing according to the present embodiment will be described hereinafter. Each recording head in the image forming unit 107 is affected by, for example, ink adhering around the nozzles, aging of piezoelectric elements and heaters that control ink ejection, and the surrounding environment such as temperature and humidity. As such, it is known that the density of an image formed on the recording paper 206 will change with each instance of printing, even when the image forming unit 107 forms the same image. Such a change in the image density appears as, for example, density unevenness and color shifts on the recording paper 206. Density unevenness and color shifts are factors that can reduce the quality of the image, and it is therefore necessary to suppress such factors as much as possible to maintain the image quality. As illustrated in FIG. 2A, the image forming system 10 according to the present embodiment can read an image formed by the recording heads 201 to 204 using the image obtainment unit 108 (e.g., a line sensor). In other words, the present embodiment makes it possible to suppress density changes by estimating the density changes in an image using the two-dimensional image data obtained by the image obtainment unit 108 and performing color stabilization processing on the image. The use of a dedicated color chart in the color stabilization processing of the image incurs extra costs such as using up the recording paper 206, the recording material (ink), time, and the like, and thus the density changes may be estimated from the image printed by the user.

Note that the image forming system 10 according to the present embodiment and illustrated in FIG. 2 forms a desired image by mixing the four recording materials of CMYK ink as desired and recording those materials on the recording medium. Changes in color density therefore occur over time, independently for each CMYK ink color. As such, performing independent gamma correction processing corresponding to each ink color on the input images corresponding to each ink color makes it possible to effectively reduce changes in the color density. "Gamma correction processing" refers to processing for adjusting the input signal of the data of each color and the signal of the image actually output relative to each other in a peripheral device that handles images (e.g., a display, a printer, or the like). However, a given image printed by a user will not necessarily have regions that contain only each ink color. In such a case, it is necessary to estimate the density change of each ink color on the basis of the density change of each ink color included in a multi-order color region in which a plurality of ink colors are mixed. Note that in many cases, the change in density of each ink color occurs on the basis of the head module or the chip module that holds the recording material. Furthermore, even for nozzles in the same head module, the amount of change in density of the ink color may differ from nozzle to nozzle. Accordingly, when correcting each ink color either in units of the head modules or in units of nozzles, it is necessary to estimate the change in density of each ink color for each unit of correction and perform the gamma correction processing for each unit of correction. The present embodiment makes it possible to perform gamma correction in units of correction corresponding to either the head modules, the chip modules, or the nozzles.

For example, when performing gamma correction independently for the four recording heads in FIG. 2A, four instances of estimation processing are necessary to estimate the density changes in the CMYK colors. In FIG. 2B, when gamma correction is performed independently on the three head modules provided in each of the four recording heads, 12 instances of the estimation processing, which are obtained by multiplying the four recording heads by three head modules, are required in order to estimate the density change for each ink color. FIG. 2C illustrates a case where the gamma correction is performed independently for the five chip modules provided in each of the 12 head modules calculated as described above. This requires 60 instances of estimation processing, which are obtained by multiplying the 12 head modules by the five chip modules. FIG. 2D illustrates a case where the gamma correction is performed independently for the 16 nozzles provided in each of the 60 chip modules calculated as described above. This requires 960 instances of estimation processing, which are obtained by multiplying the 60 chip modules by the 16 nozzles.

In this manner, as the unit by which the gamma correction is performed becomes finer, the number of instances of estimation processing for estimating the density change in each ink color increases. To perform gamma correction in finer units of correction while maintaining the printing speed on the recording medium using the recording material, it is necessary to perform the estimation processing for the density change in each ink color efficiently. Accordingly, in the present embodiment, an estimation order of each ink color and a corresponding estimated wavelength for estimating the density change in each ink color are determined from differences in the distribution of the spectral reflectance in the wavelength range of each ink color. Through this, the present embodiment realizes fast estimation processing for estimating the density of each ink color. An overview of the estimation processing for estimating the density change in each ink color according to the present embodiment will be given hereinafter with reference to FIGS. 3A to 3D. Note that the present embodiment assumes that the estimation processing is not performed for a multi-order color region containing K ink.

Figure 3A:
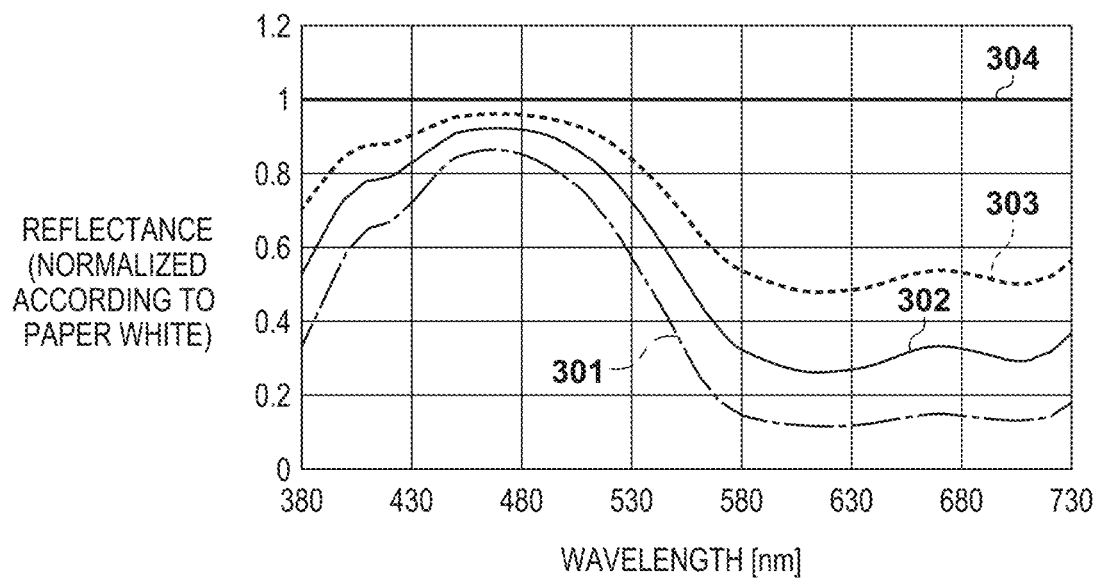
FIG. 3A is a diagram illustrating first-order color estimation processing according to embodiments of the present invention.

FIG. 3A illustrates a spectral reflectance $\rho_c(k_c,\lambda)$ of C ink ejected by the recording head 202 as an example of the present embodiment. The vertical axis in FIG. 3A represents the reflectance normalized according to paper white, and the horizontal axis represents the wavelength (nm). "Spectral reflectance" is the ratio of the spectral density of a reflected light flux to the spectral density of incident radiation, and is expressed as a function of the wavelength. Here, $\lambda$ represents the wavelength (nm) and kc represents the halftone dot ratio of the C ink (%). "Wavelength $\lambda$" refers to a wavelength from 380 nm to 730 nm, which corresponds to the visible light range that can be perceived by the human eye. "Halftone dot ratio" refers to the percentage of ink dots ejected in each of lattices in an image having, for example, 1,200 dpi as the nozzle resolution. For example, a halftone dot ratio $k_c=100(\%)$ for the C ink indicates a state in which C ink is ejected at all lattice points, whereas $k_c=0(\%)$ indicates a white background state in which C ink is not ejected at all lattice points.

Figure 3B:
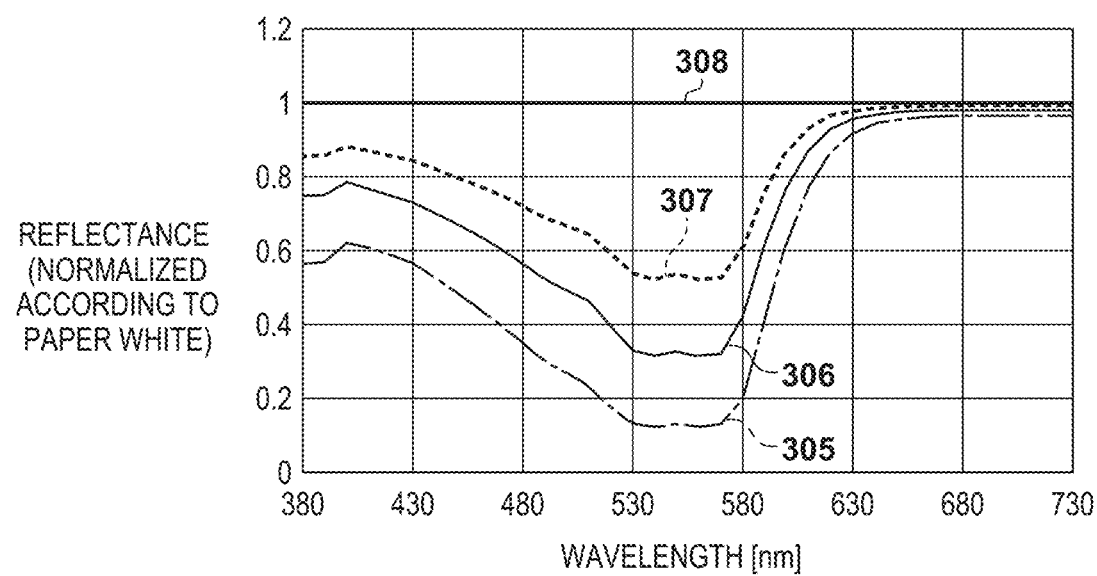
FIG. 3B is a diagram illustrating first-order color estimation processing according to embodiments of the present invention.
Figure 3C:
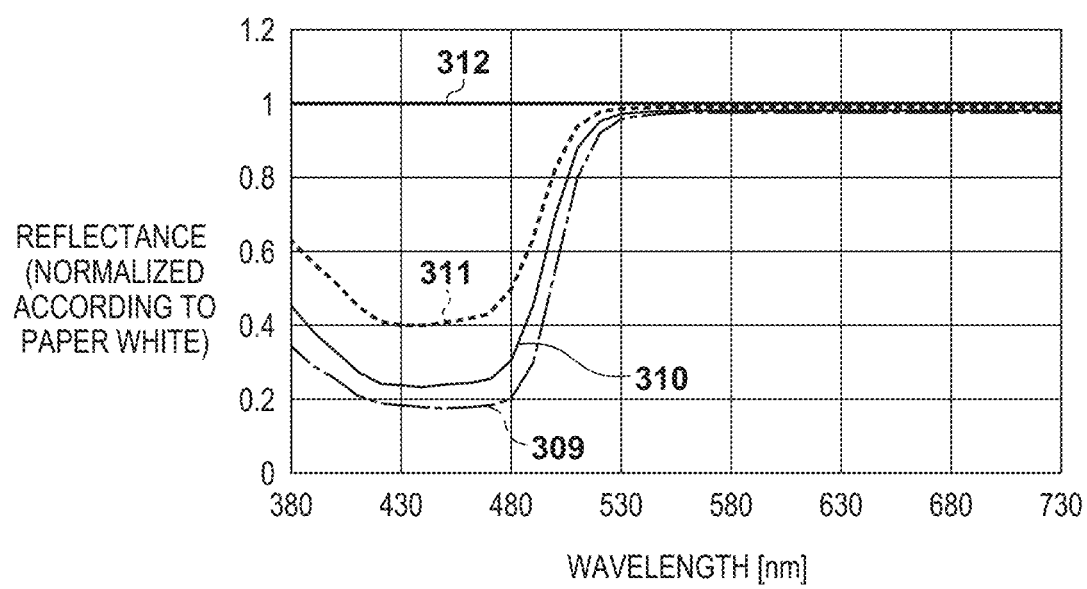
FIG. 3C is a diagram illustrating first-order color estimation processing according to embodiments of the present invention.

Curve 301 in FIG. 3A represents a spectral reflectance $\rho_c(100,\lambda)$ when C ink is ejected at a halftone dot ratio of 100%. Note that in the present embodiment, the reflectance normalized according to the spectral reflectance of the paper is used as the spectral reflectance of each ink. Next, curve 302, curve 303, and curve 304 correspond to $\rho_c(50,\lambda)$, $\rho_c(25,\lambda)$, and $\rho_c(0,\lambda)$, respectively. Note that because the spectral reflectance is normalized according to the spectral reflectance of the paper, the spectral reflectance $\rho_c(0, \lambda)$ is a reflectance of 1.0 for the entire wavelength range. FIG. 3B illustrates a spectral reflectance $\rho_m(k_m,\lambda)$ of M ink ejected by the recording head 203 as an example of the present embodiment. Curve 305, curve 306, curve 307, and curve 308 in FIG. 3B represent the spectral reflectance $\rho_m(k_m,\lambda)$ when M ink is ejected at a halftone dot ratio of 100%, 50%, 25%, and 0%, respectively. Curve 309, curve 310, curve 311, and curve 312 in FIG. 3C represent a spectral reflectance $\rho_y(k_y,\lambda)$ when Y ink is ejected at a halftone dot ratio of 100%, 50%, 25%, and 0%, respectively.

Figure 3D:
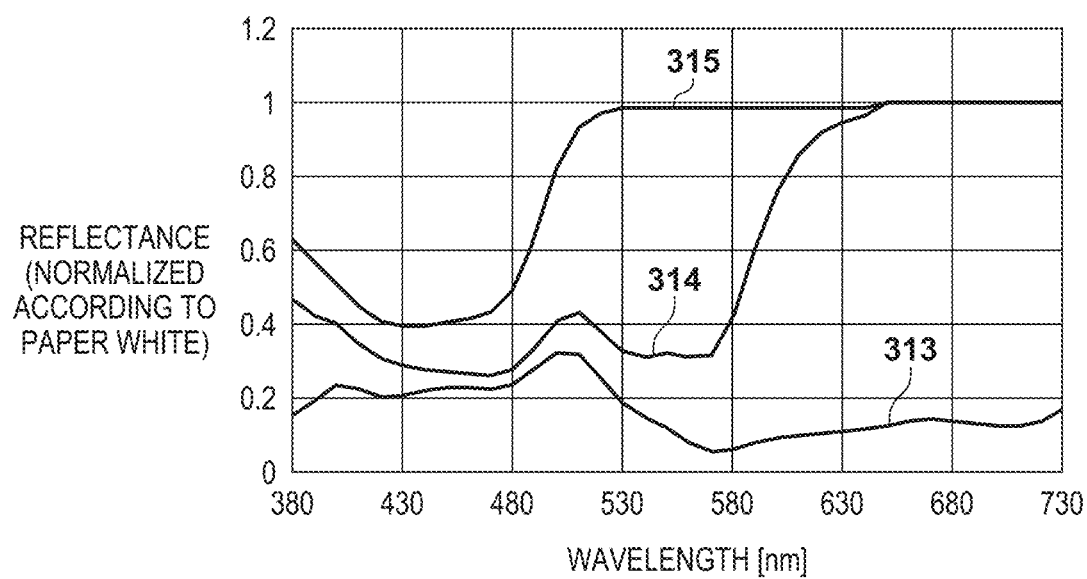
FIG. 3D is a diagram illustrating first-order color estimation processing according to embodiments of the present invention.

FIG. 3D illustrates a mixed spectral reflectance $\rho_x(k_x,\lambda)$ of a region where C ink, M ink, and Y ink are mixed, as an example of the present embodiment. Curve 313, curve 314, and curve 315 in FIG. 3D correspond to the mixed spectral reflectance of CMY inks, the mixed spectral reflectance of MY inks, and the mixed spectral reflectance Y ink, respectively. A method for estimating each spectral reflectance of CMY inks from the spectral reflectance of a mixed region, in which the CMY inks are mixed, will be described next. Specifically, each spectral reflectance of each ink is estimated on the basis of the halftone dot ratio $k_c(\%)$ of C ink, the halftone dot ratio $k_m(\%)$ of M ink, and the halftone dot ratio $k_y(\%)$ of Y ink, which satisfy Formula 1 below. Note that $\rho_x(\lambda)$ in Formula 1 represents the spectral reflectance of the mixed region of C ink, M ink, and Y ink used for estimation. Additionally, each of the spectral reflectances $\rho_c(k_c,\lambda)$, $\rho_m(k_m,\lambda)$, and $\rho_y(k_y,\lambda)$ of the CMY inks, illustrated in FIGS. 3A to 3C, have been obtained in advance before estimating each halftone dot ratio of the CMY inks.

$$\rho_x(\lambda) = \rho_c(k_c, \lambda) \times \rho_m(k_m, \lambda) \times \rho_y(k_y, \lambda) \quad \text{(Formula 1)}$$

For example, assume that the mixed spectral reflectance $\rho_x(\lambda)$ of the mixed region of the CMY inks is obtained as indicated by curve 313 in FIG. 3D. At this time, focusing on the respective spectral reflectances of the CMY inks illustrated in FIGS. 3A to 3C, the reflectances of the M ink and the Y ink indicate approximately 1.0 in a wavelength range greater than or equal to 630 nm. In the wavelength range greater than or equal to 630 nm, the M ink and the Y ink reflect all light (i.e., there is no sensitivity), and only the C ink absorbs light (i.e., has sensitivity). Considering the differences between the spectral reflectance characteristics of each ink color, if, for example, the wavelength $\lambda$ is set to 650 in Formula 1 and the reflectances $\rho_m$ and $\rho_y$ of the M ink and the Y inks are set to 1.0 respectively, the following Formula 2 is obtained. The halftone dot ratio $k_c$ of the C ink is estimated next on the basis of Formula 2. Here, the spectral reflectance $\rho_c(k_c,650)$ and the halftone dot ratio $k_c$ are in a monotonically decreasing relationship, in which the reflectance pc decreases as the halftone dot ratio $k_c$ increases, as illustrated in FIG. 3A. On the basis of this relationship, the halftone dot ratio $k_c$ of the C ink that satisfies Formula 1 can be calculated easily and quickly.

$$\rho_x(650) = \rho_c(k_c, 650) \quad \text{(Formula 2)}$$

The halftone dot ratio $k_m$ of the M ink is estimated next on the basis of the estimated halftone dot ratio $k_c$ of the C ink. For example, assume that the halftone dot ratio of the C ink is estimated to be $k_c=90\%$ through Formula 2. At this time, a mixed spectral reflectance $\rho_x'(\lambda)$, which is obtained by dividing the mixed spectral reflectance $\rho_x(\lambda)$ by the halftone dot ratio kc of the C ink, is obtained as the following Formula 3. Curve 314 in FIG. 3D is a curve representing the mixed spectral reflectance $\rho_x'(\lambda)$ obtained on the basis of Formula 3. The mixed spectral reflectance $\rho_x'(\lambda)$ will also be called a "third spectral reflectance".

$$\rho'_x(\lambda) = \rho_x(\lambda)/\rho_c(90, \lambda) \quad \text{(Formula 3)}$$

Focusing on the spectral reflectance characteristics of the M and Y inks illustrated in FIGS. 3B and 3C, in the wavelength range around 550 nm, the reflectance of the Y ink is approximately 1.0, while M ink is a reflectance py of less than 1.0. In other words, in the wavelength range around 550 nm, the Y ink reflects all light (i.e., has no sensitivity), while the M ink absorbs light (i.e., has sensitivity). On the basis of the difference in spectral reflectance characteristics between the M ink and Y ink, if, for example, the wavelength λ is set to 550 in Formula 3 and the reflectance $\rho_y$ of the Y ink is set to 1.0, the following Formula 4 is obtained. The halftone dot ratio km of the M ink is estimated next on the basis of Formula 4. Here, the spectral reflectance $\rho_m(k_m, 550)$ of the M ink and the halftone dot ratio kmare in a monotonically decreasing relationship, in which the reflectance $\rho_m$ decreases as the halftone dot ratio $k_m$ increases, as illustrated in FIG. 3B. On the basis of this relationship, the halftone dot ratio $k_m$ of the M ink that satisfies Formula 1 can be calculated uniquely.

$$\rho'_x(550) = \rho_m(k_m, 550) \quad \text{(Formula 4)}$$

Next, a spectral reflectance $\rho_x''(\lambda)$ is obtained as the following Formula 5 by dividing the spectral reflectance $\rho_x'(\lambda)$ by the estimated halftone dot ratio km of the M ink. Curve 315 in FIG. 3D represents the spectral reflectance $\rho_x''(\lambda)$ obtained on the basis of Formula 5.

$$\rho_x''(\lambda) = \rho_x'(\lambda)/\rho_m(k_m, \lambda) \quad \text{(Formula 5)}$$

At this time, the influence of the halftone dot ratio kc and the halftone dot ratio $k_m$ of the C ink and the M ink is eliminated from the mixed region of the CMY inks, and thus the spectral reflectance $\rho_x''(\lambda)$ is expressed by the following Formula 6. For example, the halftone dot ratio $k_y$ of the Y ink is estimated on the basis of the wavelength λ=450 nm in Formula 6. Here, the spectral reflectance $\rho_y(k_y,450)$ of the Y ink and the halftone dot ratio $k_y$ are in a monotonically decreasing relationship, in which the reflectance $\rho_y$ decreases as the halftone dot ratio $k_y$ increases, as illustrated in FIG. 3C. On the basis of this relationship, the halftone dot ratio $k_y$ of the Y ink that satisfies Formula 1 can be calculated uniquely.

$$\rho_x''(\lambda) = \rho_y(k_y, \lambda) \quad \text{(Formula 6)}$$

As mentioned above, the difference between the spectral reflectance characteristics for the wavelength ranges of the CMY inks makes it possible to select an estimation order and a wavelength at which the reflectances of the CMY inks can be calculated. This in turn makes it possible to easily and quickly estimate the halftone dot ratio kc, the halftone dot ratio $k_m$, and the halftone dot ratio $k_y$ associated with the respective reflectance $\rho_c$, reflectance $\rho_m$, and reflectance $\rho_y$ of the CMY inks that satisfy Formula 1. By performing the stated estimation processing for each head module, for example, the reflectance of each ink color corresponding to each head module can be obtained. Furthermore, on the basis of each reflectance obtained, a gamma correction table can generated such that the reflectances are substantially the same among the head modules when taking either the head module or the wavelength as a reference. Additionally, using the stated monotonically decreasing relationship when generating the gamma correction table makes it possible to easily obtain a correction value for substantially matching the reflectance of the ink in a reference module. Applying the gamma correction values obtained as described above to an input image makes it possible to suppress the occurrence of color density changes over time.

FIG. 4 illustrates functions of the image processing unit 106 according to the present embodiment. The functional configuration of the image processing unit 106 that executes the color stabilization processing will be described with reference to FIG. 4. The image processing unit 106 includes a color conversion processing unit 401, a correction processing unit 402, an HT processing unit 403, an estimation parameter setting unit 404, and a first-order color estimation processing unit 405. The image processing unit 106 also includes a correction table generation unit 406, a correction table 407, a target setting unit 408, and target characteristics 409. Furthermore, the estimation parameter setting unit 404 is configured including an ink characteristic obtainment unit 4041, a processing order setting unit 4042, and a wavelength selection unit 4043. Additionally, the first-order color estimation processing unit 405 is configured including a first-order color estimation unit 4051, ink characteristics 4052, a processing order 4053, and selected wavelength 4054.

The color conversion processing unit 401 converts input image data from the storage unit 105 into image data corresponding to the color reproduction gamut of the printer. The image data input is, for example, data indicating color coordinates (R, G, B) in color space coordinates such as sRGB, which is the color representation of monitors. "sRGB" is a standard established by the International Electrotechnical Commission (IEC), an international standardization organization. The color conversion processing unit 401 performs processing for converting color signals corresponding to the plurality of ink colors used in the image forming unit 107. For example, if the image forming unit 107 uses black (K), cyan (C), magenta (M), and yellow (Y) inks, the RGB signal image data is converted into image data containing 8-bit color signals for each of K, C, M, and Y. The image data may be converted using a publicly-known method, such as matrix arithmetic processing, processing using a three-dimensional LUT (lookup table), and the like, for example. Note that the input image data is not limited to data expressing RGB, but may also be data that directly represents each color of the CMYK ink. However, to limit the total amount of each ink and for color management, the color conversion processing unit 401 may use a four-dimensional LUT that converts CYMK into C'M'Y'K'. The correction processing unit 402 performs correction processing for stabilizing the color of the image according to changes in the image data over time. More specifically, the correction processing unit 402 can perform gamma correction for each instance of CMYK image data by using the correction table 407 for each ink color calculated for each module or for each nozzle.

FIG. 5 is a diagram illustrating an example of the correction table 407 according to the present embodiment. The correction table 407 holds the corrected color signal values for each of the head modules 201a to 204c, corresponding to input color signals from 0 to 255. Note that the recording head 201 includes head modules 201a, 201b, and 201c, and the recording head 202 includes head modules 202a, 202b, and 202c. The recording head 203 includes a head module 203a, a head module 203b, and a head module 203c, and the recording head 204 includes a head module 204a, a head module 204b, and a head module 204c. In FIG. 5, for example, if the recording head 201 has K ink and the input color signal value for K is 32, the correction processing unit 402 changes the input color signal value from 32 to 28. With regard to the conversion of CMYK ink color signals, the present embodiment can perform the correction processing for each ink color using the color signal values corresponding to the correction table of each head module corresponding to the ejection of the CMYK ink.

Note that when the color correction processing is performed not in units of head modules, but in units of chip modules or nozzles, the correction table 407 is provided with information on color signal values equal to the number of chip modules or nozzles. Input color signal values that do not exist in the correction table (also called an "LUT") illustrated in FIG. 5 may be calculated through interpolation with input color signal values near those held in the LUT. The converted input color signal values corresponding to the input color signal values for all colors may also be held in the LUT without using interpolation processing. Alternatively, the correction processing for the input color signals is not limited only to conversion using the correction table 407, and may be performed through, for example, function conversion and matrix conversion.

Returning to FIG. 4, the HT processing unit 403 performs HT processing on the color signal image data after the color correction processing to convert that data into a number of tones that the image forming unit 107 can express, and generates halftone image data. Specifically, the HT processing unit 403 converts the image data having 8 bits per pixel into 1-bit binary halftone image data having a value of either 0 or 1 for each pixel. The HT processing may be performed through a publicly-known method such as error diffusion processing, dither processing, or the like, for example. The estimation parameter setting unit 404 obtains, from the image obtainment unit 108, a spectral reflectance $\rho_x(x,y,\lambda)$ corresponding to each of pixel positions (x,y), and calculates the spectral reflectances $\rho_c(k_c,\lambda)$, $\rho_m(k_m,\lambda)$, and $\rho_y(k_y,\lambda)$ for each ink color. Furthermore, on the basis of the calculated spectral reflectance of each ink, the image obtainment unit 108 determines the estimation order of each ink color and an estimated wavelength for estimating each ink color to calculate the halftone dot ratio of each ink color. The processing by the estimation parameter setting unit 404 will be described in detail later.

The first-order color estimation processing unit 405 obtains the spectral reflectance $\rho_x(x,y,\lambda)$ corresponding to each pixel position (x,y) from the image obtainment unit 108, and estimates the reflectances $\rho_c$, $\rho_m$, and $\rho_y$ of each ink at each pixel position. The estimation processing performed by the first-order color estimation processing unit 405 will be described in detail later. The correction table generation unit 406 generates the correction table 407 on the basis of the reflectance of each ink at each pixel position (x,y) estimated by the first-order color estimation processing unit 405 and the corrected color signal values. The correction table generation processing will be described in detail later.

Figure 7:
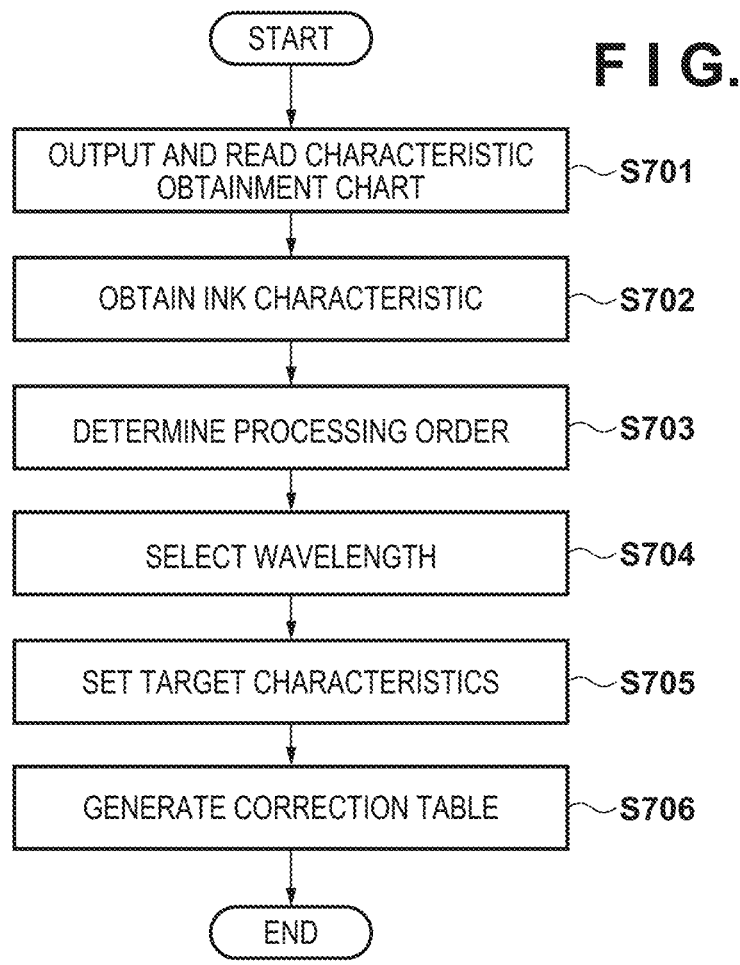
FIG. 7 is a flowchart illustrating advance setting processing according to a first embodiment.
Figure 8:
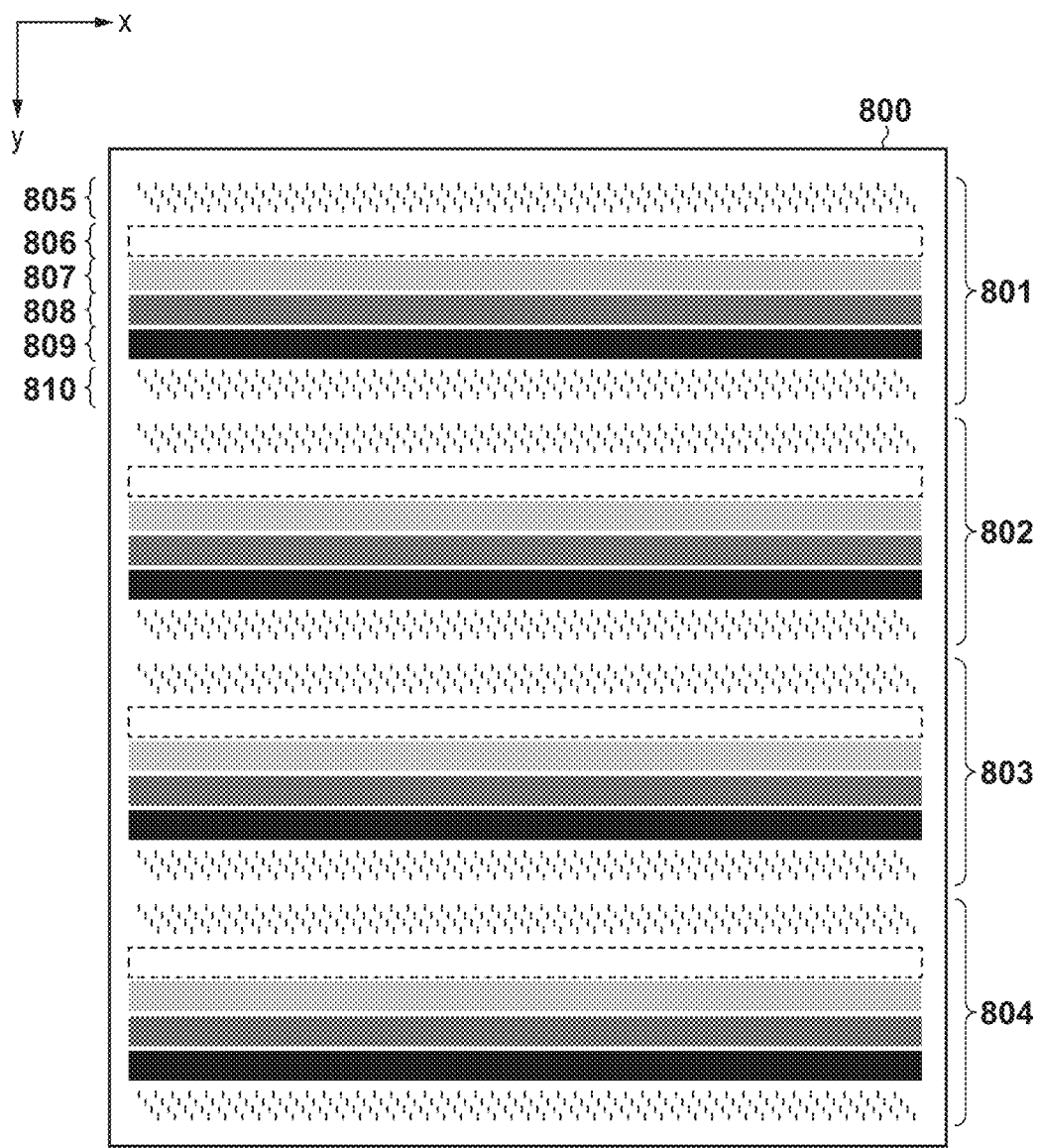
FIG. 8 is a diagram illustrating an example of a characteristic obtainment chart according to the first embodiment.

The image forming system 10 according to the present embodiment performs various types of settings before an image is printed by the user. Specifically, the first-order color estimation processing unit 405 sets parameters required in the estimation processing and target characteristics of each ink color when generating the correction table, and generates the correction table 407. FIG. 7 illustrates a flow of advance settings according to the present embodiment. Each step of the advance settings flow will be described hereinafter with reference to FIG. 7. First, in step S701, the image processing unit 106 outputs and reads a characteristic obtainment chart 800 for calculating the setting parameters. Specifically, the image processing unit 106 performs HT processing on the characteristic obtainment chart 800 illustrated in FIG. 8, and the image forming unit 107 forms the result as an image on the recording medium. Furthermore, the image obtainment unit 108 reads the formed image and obtains the spectral reflectance $\rho_x(x,y,\lambda)$ corresponding to each pixel position (x,y). The characteristic obtainment chart 800 illustrated in FIG. 8 is configured including a block 801, a block 802, a block 803, and a block 804 on a two-dimensional paper surface. The recording heads 201 to 204 form the blocks 801 to 804, respectively, on the paper. The block 801 is configured including patterns 805 to 810. The blocks 802 to 804 have the same configuration as the block 801, and each includes the patterns 805 to 810.

For example, the block 801 is formed by having only the recording head 201 filled with K ink eject K ink onto the paper surface. The block 802 is formed by having only the recording head 202 filled with C ink eject C ink onto the paper surface. The block 803 is formed by having only the recording head 203 filled with M ink eject M ink onto the paper surface. The block 804 is formed by having only the recording head 204 filled with Y ink eject Y ink onto the paper surface. Incidentally, the pattern 805 and the pattern 810 in FIG. 8, which are indicated by a plurality of vertical dotted lines in a band, represent discharge failure nozzle detection patterns. A "discharge failure nozzle" is a nozzle that has become clogged with ink due to the recording head being left unused for a long period of time or the like, resulting in a failure to eject ink. In the present embodiment, a line-shaped pattern is used to determine whether or not ink is ejected by each nozzle provided in the recording head. Meanwhile, patterns 806 through 809 are uniform patterns of K ink recorded on the paper surface with different K ink color signal values. The color signal values are, for example, values 0, 64, 128, and 255, which correspond to halftone dot ratios of 0%, 25%, 50%, and 100%, respectively. For example, the pattern 806 is recorded with a color signal value of 0, and the pattern 807 is recorded with a color signal value of 64. The pattern 808 is recorded with a color signal value of 128, and the pattern 809 is recorded with a color signal value of 255.

Returning to FIG. 7, in step S702, the ink characteristic obtainment unit 4041 extracts an image region corresponding to any of patterns 806 to 809 from the spectral reflectance $\rho_x(x,y,\lambda)$ of the formed image and averages the image region in the paper transport direction 207 to make the image region one-dimensional. Each image region is extracted on the basis of the pixel position (x,y). Alternatively, the image region can be extracted on the basis of the x position of a line pattern output by the same nozzle in the discharge failure detection patterns represented by the pattern 805 and the pattern 810 in FIG. 8. Alternatively, in the present embodiment, markers may be embedded in the paper to facilitate the extraction of the image region. The obtained one-dimensional image data is averaged over the corresponding image region for each head module. As a result, the spectral reflectance characteristics $\rho_c(k_c,\lambda)$, $\rho_m(k_m,k)$, $\rho_y(k_y,\lambda)$, and $\rho_k(k_k,\lambda)$ of each ink, represented by curves 301 to 312, respectively, in FIG. 3, are obtained for each head module.

The obtained spectral reflectance of each ink color is held in the first-order color estimation processing unit 405 as the ink characteristics 4052 and used in the first-order color estimation processing, which will be described later. If a discharge failure nozzle has arisen during the output of the characteristic obtainment chart 800, the spectral reflectance characteristics of each ink may contain errors due to blank dots. By estimating a first-order color of the formed image on the basis of the spectral reflectance containing errors due to blank dots and performing the color correction processing, uneven density and color shifts will arise, for example. Accordingly, before obtaining the spectral reflectance characteristics of each ink color, discharge failure detection processing based on the patterns 805 and 810 for discharge failure nozzle detection is performed. Specifically, the spectral reflectance of the image region corresponding to the pattern 805 and the pattern 810 for discharge failure nozzle detection in the scanned image may be referenced, and the nozzles corresponding to the positions where the reflectance is greater than or equal to a threshold value may be taken as discharge failure nozzles. When a discharge failure nozzle is detected, the spectral reflectance of the image region corresponding to the discharge failure nozzle may be deleted, and interpolation processing may then be performed with the spectral reflectances around the stated image region to obtain a spectral reflectance from which errors are eliminated. Alternatively, the characteristic obtainment chart 800 may be re-output after a recovery operation, such as the suction and wiping of ink adhering to the discharge failure nozzle, is performed. Through this, the present embodiment can prevent inaccurate spectral reflectances from being obtained due to the influence of discharge failure nozzles.

Next, in step S703, the processing order setting unit 4042 determines the order in which the first-order color estimation processing unit 405 is to estimate the spectral reflectance. Specifically, when the spectral reflectance of each ink is segmented into a certain wavelength range, the processing order setting unit 4042 raises the processing order for inks that have many wavelengths where the reflectance of each ink is lower than the reflectance of approximately 1.0 in the segmented wavelength range. In other words, if there is a wavelength range where the reflectance of each ink is lower than the reflectance of approximately 1.0, each ink is determined to have sensitivity in that wavelength range. FIG. 9 illustrates the sensitivity distribution of the reflectance for each wavelength range of the CMY inks. The determination of the estimation processing order of the CMY inks will be described in detail with reference to FIG. 9. FIG. 9 illustrates information in which the sensitivity of the reflectance of each ink in each wavelength range is classified into one of three levels (Excellent "○", Good "Δ", and Poor "X") on the basis of the spectral reflectances of the CMY inks illustrated in FIGS. 3A to 3C, respectively. The unit for each wavelength range is nm.

FIG. 9 classifies a wavelength as Excellent if the average reflectance in the wavelength range is greater than or equal to 0.9, Good if the average reflectance is greater than or equal to 0.8, and Poor if the average reflectance is less than 0.8. Here, the order of the estimation processing for each ink is determined such that inks having a large number of wavelength ranges with sensitivity (i.e., a large number of Poors) are processed preferentially. In the example illustrated in FIG. 9, C ink has five Poors, M ink has four Poors, and Y ink has two Poors, and thus the estimation processing is performed in the order of C, M, and Y. Note that if there are a plurality of inks having the same number of Poors, which is an indicator for determining the order of the estimation processing, the ink with the highest number of Goods among the plurality of inks may be set preferentially in the order of processing. The estimation order of each color obtained on the basis of the determination result of the sensitivity distribution is held in the first-order color estimation processing unit 405 as the processing order 4053 and used in the first-order color estimation processing (described later).

The flow of advance settings will be described again, returning to FIG. 7. In step S704, the wavelength selection unit 4043 determines the estimated wavelength for estimating the reflectance of each ink in the first-order color estimation processing. At this time, the wavelength is determined according to the estimation processing order for each ink color, determined as described above. Specifically, on the basis of the classification illustrated in FIG. 9, if there is an Excellent in the wavelength range of all inks that are later in the processing order than the target ink, and if there is a wavelength range that has not been selected for all inks that are earlier in the processing order than the target ink, the wavelength having the lowest reflectance may be selected. For example, when determining the wavelength for C ink according to FIG. 3A and FIG. 9, the wavelength ranges in which both M ink and Y ink are Excellent are 630-680 nm and 680-730 nm. The wavelength having the lowest reflectance of C ink in this range may be selected. In other words, the wavelength $\lambda=700$ nm can be selected as the wavelength for C ink.

The selection of the estimated wavelength for M ink will be described next. In FIG. 9, the wavelength ranges in which Y ink has an Excellent are 530-580 nm, 580-630 nm, 630-680 nm, and 680-730 nm. Here, the wavelength for M ink may be selected from the wavelength having the lowest reflectance in the 530-680 nm range, excluding 680-730 nm, which is the wavelength range that includes the wavelength selected for C ink. As a result, for example, $\lambda=560$ nm is selected as the wavelength for M ink. Finally, the wavelength for Y ink is determined. In other words, the wavelength having the lowest reflectance may be selected, excluding 680-730 nm and 530-580 nm, which include the wavelengths selected for C ink and M ink, respectively. Accordingly, a wavelength of 450 nm is selected for Y ink, for example. The obtained wavelengths for each ink are held in the first-order color estimation processing unit 405 as the selected wavelengths 4054 and are used in the first-order color estimation processing (described later).

Returning to FIG. 7, in step S705, the target setting unit 408 determines the target characteristics 409 of each ink on the basis of the stated ink characteristics, processing order, and selected wavelengths. For example, ink characteristics serving as a target can be set such that the color signal value and reflectance of each ink color are linear. Alternatively, either the head module or the nozzle may be used as a reference, and the ink characteristics of the head module or the nozzle may be used as the target characteristics.

Figure 10A:
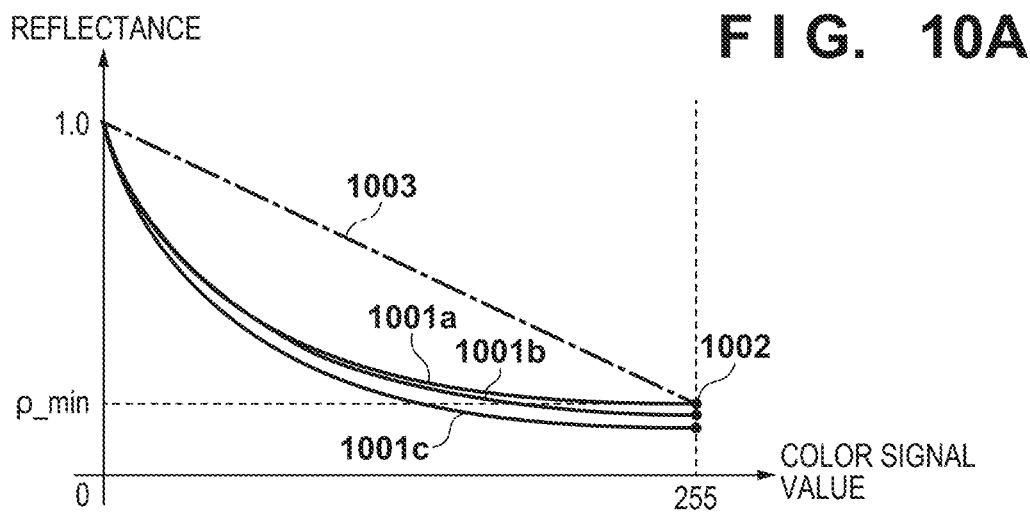
FIG. 10A is a diagram illustrating spectral reflectance characteristics of a head module according to the first embodiment.
Figure 10B:
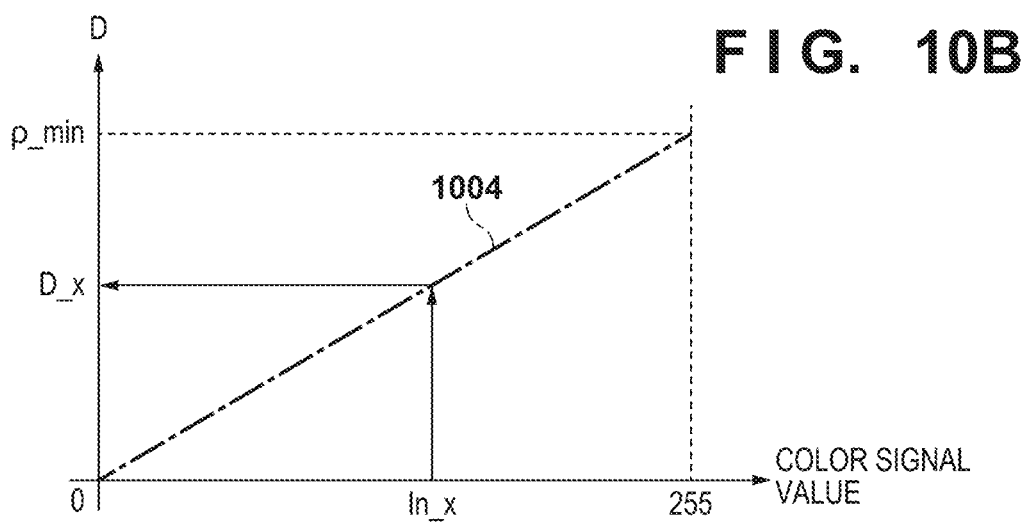
FIG. 10B is a diagram illustrating spectral reflectance characteristics of the head module according to the first embodiment.
Figure 10C:
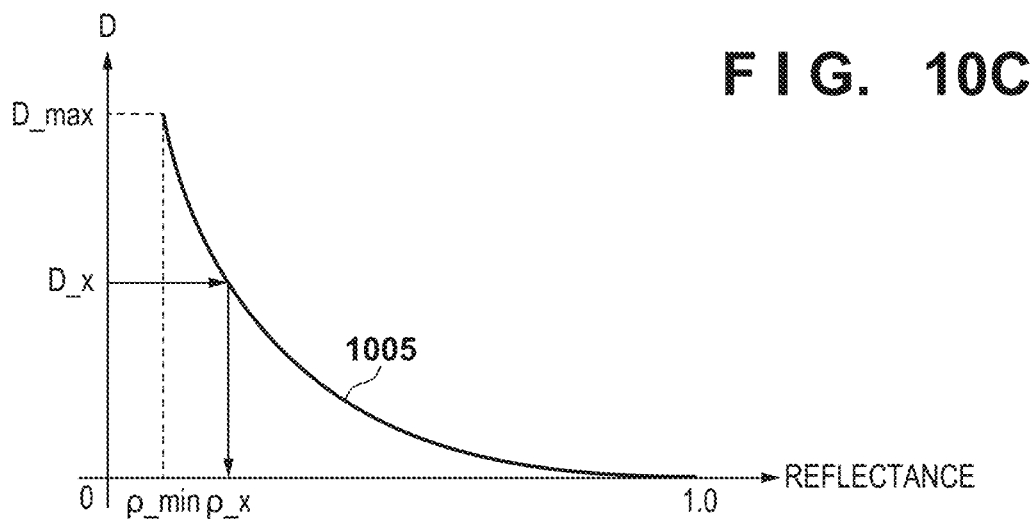
FIG. 10C is a diagram illustrating spectral reflectance characteristics of the head module according to the first embodiment.

FIGS. 10A to 10C illustrate the reflectances of the inks in the head modules. The following will describe an example in which the target characteristics of C ink are determined on the basis of the ink characteristics of the head modules 201a, 201b, and 201c when performing color correction processing on a head module basis. Curves 1001a to 1001c in FIG. 10A represent the reflectance p corresponding to each of the head modules 201a to 201c. In FIG. 10A, the vertical axis represents the reflectance, and the horizontal axis represents the color signal value. When the wavelength selection unit 4043 determines, for example, that a wavelength $\lambda_c$ for C ink is 700 nm, the reflectance p can be calculated by using a publicly-known interpolation method on the halftone dot ratio $k_c$ and the spectral reflectance $\rho_c(k_c, 700)$ in each color signal value.

At this time, to determine the target characteristics of C ink where the color signal value and the reflectance are linear, a reflectance ρ_min of the head module having the highest reflectance for the highest color signal 255 is obtained. In the example illustrated in FIG. 10A, ρ_min represents the reflectance of curve 1001a at color signal 255 (indicated by point 1002). A straight line 1003 (indicated as a dot-dash line) obtained by connecting the two points of the reflectance 1.0 at color signal value 0 and the reflectance ρ_min at the highest color signal 255 may be used as the target characteristics 409. Alternatively, with the head module configuration illustrated in FIG. 2B, the curve 1001b corresponding to the head module 201b, which is the most centrally located of the plurality of head modules, may be used as the target characteristics 409. Alternatively, the average reflectance of all or some of the head modules may be used as the target characteristics.

For example, a curve (not shown) obtained by averaging the curves 1001a to 1001c with the color signal values of each color, respectively, may be used as the target characteristics 409. The target characteristics 409 may be determined on the basis of another value instead of the reflectance characteristics. For example, the target characteristics 409 can be set such that a distance D from the recording medium color (paper white) in the CIELab space and the color signal value are linear. The "CIELab space" is a uniform color space defined by the CIE (the International Commission on Illumination), and is a color space that uses three-dimensional orthogonal coordinates. Note that the distance D from paper white can be calculated through the following Formula 7. Formula 7 expresses a lightness difference between two colors and a chromaticity difference between the two colors in Lab space coordinates. Note that in Formula 7, $L_w$, $a_w$, and $b_w$ represent the Lab values (color values) of the recording medium color, respectively. L and $L_w$ represent the lightness of the color, a and aw represent the saturation of the color from green to red, and b and $b_w$ represent the saturation of the color from blue to yellow.

$$D = \sqrt{(L - L_W)^2 + (a - a_W)^2 + (b - b_W)^2} \quad \text{(Formula 7)}$$

Specifically, the target characteristics 409 can be determined such that a maximum distance D_Max passes through the origin and the highest color signal 255, as indicated by straight line 1004 (indicated as a dot-dash line) in FIG. 10B. Note that the maximum distance D_Max is the distance D calculated using the reflectance ρ_min. To calculate a reflectance ρ_x for an input color signal value In_x, the distance D_x from the paper white is obtained for the input color signal value In_x, as illustrated in FIG. 10B. Furthermore, as illustrated in FIG. 10C, the reflectance ρ_x corresponding to the obtained distance D_x can be obtained from curve 1005 that associates the distance D with the reflectance ρ. Note that curve 1005 can be calculated by using a publicly-known interpolation method on the Lab value calculated according to Formula 7 from CIELab, from the spectral reflectance $\rho_c(k_c, \lambda)$ of C ink, and the halftone dot ratio at each color signal value. By using a curve (not shown) of the reflectance ρ_x for the input color signal value In_x obtained in this manner as the target characteristics 409, the target characteristics 409 of the ink can be determined such that the distance D from paper white and the color signal value are linear.

Figure 6:
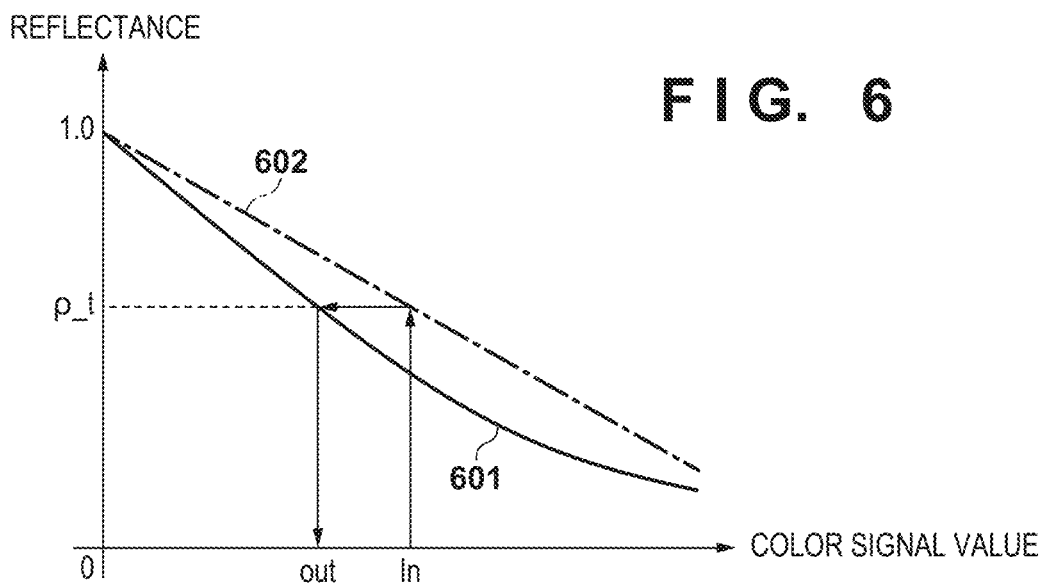
FIG. 6 is a diagram illustrating processing for generating the correction table according to embodiments of the present invention.

Returning to FIG. 7, in step S706, the correction table generation unit 406 generates the correction table 407 on the basis of the ink characteristics 4052, the selected wavelength 4054, and the target characteristics 409. The processing for generating the correction table 407 will be described with reference to FIG. 6. Curve 601 in FIG. 6 is a curve representing the ink characteristics of either the head module or the recording head for which the color correction processing is performed. Dot-dash line 602 represents the target characteristics 409, which is the target of the color correction processing. First, a target reflectance ρ_t corresponding to an input color signal value In is calculated using the dot-dash line 602. Next, the color signal value corresponding to the target reflectance ρ_t on curve 601 is obtained as a correction value out. The correction table generation unit 406 can generate the correction table 407 by associating the correction value out obtained as described above with the input color signal value In and holding these in the storage unit 105. Note that the correction table generation unit 406 may hold the correction table 407, in which the correction value out is calculated for all values of the input color signal value In from 0 to 255, as a table of nozzles to be corrected. Alternatively, the correction table generation unit 406 may generate the correction table 407 in which only the correction values out corresponding to, for example, 0, 16, 32, ..., 240, and 255 are calculated as predetermined input color signals illustrated in FIG. 5.

Note that although FIG. 6 illustrates the ink characteristics of one of the head modules or recording heads, a number of ink characteristic curves equal to the number of head modules or nozzles can be obtained. By repeating the processing of generating the correction table 407 for all the ink characteristics, the correction value out corresponding to each head module or each nozzle can be calculated. Additionally, before an image is printed by a user, the correction table 407 that associates the input color signal value In of each color calculated through the characteristic obtainment chart 800 illustrated in FIG. 8 with the correction value out is generated in advance. Through this, the present embodiment can reduce the possibility of falling into a local optimum solution when correcting a read image from the user, as will be described later. The present embodiment can also suppress significant color correction immediately after the printing of an image starts and unintended color densities each time an image is printed.

The flow of printing an image to be printed by the user will be described hereinafter with reference to FIG. 11. First, in step S1101, the user causes the image forming system 10 to execute a print job by entering an operation in the operation unit 103. Specifically, the user specifies the name of an input image file held in the storage unit 105 and a number of copies N to be output. In step S1102, the image forming unit 107 outputs (prints) the image, and the image obtainment unit 108 reads the printed image. Specifically, the image processing unit 106 obtains an image stored in the storage unit 105 in advance on the basis of the filename specified by the user. The image obtained by the image processing unit 106 is sent to the color conversion processing unit 401 and undergoes color conversion processing. After the color conversion processing, the color-converted image is sent to the HT processing unit 403 via the correction processing unit 402. The correction processing unit 402 performs tone conversion for each ink color to suppress density unevenness in the image using the correction table 407, which is different for each head module or nozzle. The HT processing unit 403 converts the color signal image data after the color tone conversion to convert that data into a number of tones that the image forming unit 107 can express, and generates halftone image data. The image forming unit 107 forms the image data after the halftone processing on the paper surface. The image formed by the image forming unit 107 will be called a "formed image 400". The image obtainment unit 108 obtains the spectral reflectance $\rho_x(x,y,\lambda)$ by reading the formed image 400.

If the resolution of the formed image 400 obtained by the image obtainment unit 108 is different from the resolution of the input image, the image processing unit 106 may convert the resolution of the obtained formed image 400 so that the resolutions of both images match. The resolution conversion may be done by, for example, the nearest neighbor method, bilinear interpolation, bicubic interpolation, or the like. Additionally, the image processing unit 106 may, for example, perform geometric correction on the obtained formed image 400 if the paper is skewed when forming the image or if aberration or the like of the spectral sensor is high. Geometric correction may be performed, for example, by affine transformation, projective transformation, and the like. If the image processing unit 106 is to perform resolution conversion and geometric correction on the obtained formed image 400, the image processing unit 106 may be provided with a resolution conversion processing unit (not shown) and a geometric correction processing unit (not shown) in advance. Alternatively, the image obtainment unit 108 may calculate a spectral reflectance $\rho_x$ by performing resolution conversion and geometric correction of the image in units of a predetermined number of lines when a raster image is obtained. Markers that facilitate the resolution conversion and geometric correction of the obtained formed image 400 may be included in the characteristic obtainment chart 800 in advance.

In step S1103, the first-order color estimation unit 4051 estimates the reflectance of each ink using the spectral reflectance $\rho_x(x,y,\lambda)$ at each pixel position. In step S1104, the correction table generation unit 406 modifies the correction table 407 on the basis of the input color signal values of each ink after the correction processing and the reflectance of each ink estimated by the first-order color estimation unit 4051. The correction processing for the correction table 407 will be described in detail later. Next, in step S1105, the CPU 100 determines whether or not the user has finished outputting all of the jobs input to the image forming system 10. If all jobs are complete, the CPU 100 ends the printing processing for the image by the user (Yes in step S1105). On the other hand, if the jobs are not complete, the processing returns to step S1102 and the printing continues (No in step S1105).

Figure 12:
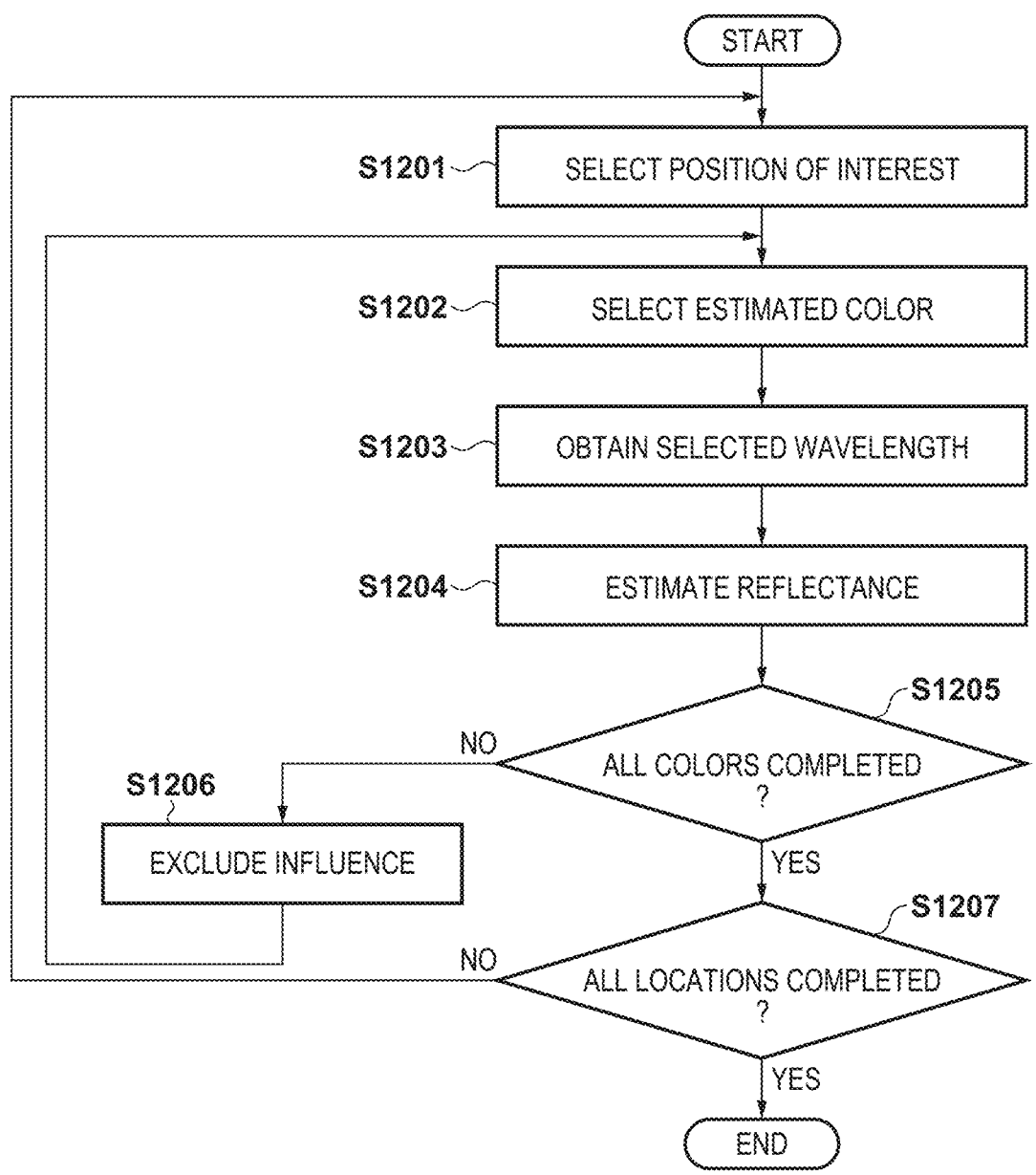
FIG. 12 is a flowchart illustrating first-order color estimation processing according to the first embodiment.

The first-order color estimation processing in step S1103 will be described in detail with reference to FIG. 12. In step S1201, the first-order color estimation unit 4051 determines a pixel position (xi,yi) in the image. The first-order color estimation unit 4051 obtains, for example, a spectral reflectance $\rho_x(xi,yi,\lambda)$ at a position where the coordinate xi=0 and the coordinate yi=0. Incidentally, the spectral reflectance ρx represents the reflectance of an image region where all the inks are mixed. Next, in step S1202, the first-order color estimation unit 4051 selects an estimated color of the ink at the pixel position (xi,yi) by referring to the processing order 4053. For example, if the order of the estimated colors of ink stored in the processing order 4053 is C, M, and Y, the first-order color estimation unit 4051 selects C as the estimated color. In step S1203, the first-order color estimation unit 4051 obtains the wavelength corresponding to the estimated color (e.g., C ink) from the selected wavelength 4054. For example, if the estimated color is C, the first-order color estimation unit 4051 obtains the wavelength $\lambda=700$ nm, which corresponds to C. In step S1204, the first-order color estimation unit 4051 estimates the reflectance of the estimated color on the basis of the obtained estimated color and the wavelength corresponding thereto. In other words, first-order color estimation unit 4051 can estimate a spectral reflectance $\rho_x(xi,yi,700)$ as the reflectance of C ink at the pixel position (xi,yi).

In step S1205, the first-order color estimation unit 4051 determines whether or not the estimation processing is complete for the reflectance of all the ink colors specified in the processing order 4053. If the estimation processing is not complete, the process moves to step S1206 (No in step S1205). On the other hand, if all the estimation processing is complete, the processing moves to step S1207 (Yes in step S1205). In step S1206, the first-order color estimation unit 4051 excludes the influence (e.g., the spectral reflectance) of C ink estimated in step S1204 from the spectral reflectance $\rho_x(x_i,y_i,\lambda)$. Specifically, the first-order color estimation unit 4051 obtains the ink characteristics of the estimated color by referring to the ink characteristics 4052. Using the ink characteristics, the spectral reflectance $\rho_c(k_c,\lambda)$ is obtained, for example. Furthermore, the first-order color estimation unit 4051 calculates the halftone dot ratio $k_c$ of C ink, where $\rho_x(x_i,y_i,700)=\rho_c(k_c,700)$. By eliminating the influence the spectral reflectance of the C ink, the first-order color estimation unit 4051 obtains a new spectral reflectance $\rho_x'=\rho_x(x_i,y_i,\lambda)/\rho_c(k_c,\lambda)$. In the subsequent processing, the newly obtained spectral reflectance $\rho_x'$ is used in the estimation processing, and the processing returns to step S1202. Next, in step S1202, the first-order color estimation unit 4051 selects M ink, and the processing moves to step S1203.

In step S1207, the first-order color estimation unit 4051 determines whether or not the reflectance of each selected ink color has been estimated at all image locations $(x_i,y_i)$. When the estimation of the reflectance is complete, the processing ends (Yes in step S1207). If the estimation of the reflectance is not complete, the processing returns to step S1201, where the first-order color estimation unit 4051 selects a new pixel position $(x_i,y_i)$ for which the reflectance has not yet been estimated. Although the present embodiment estimates the reflectance of the first-order color for the entire image using the pixel position as the unit of processing, it should be noted that the estimation processing may be performed only at a representative pixel position corresponding to the unit by which each ink color is corrected (e.g., the head module and the nozzle). Alternatively, the reflectance may be estimated for each ink color in units of blocks, obtained by averaging pixel blocks containing two or more pixels.

Figure 13A:
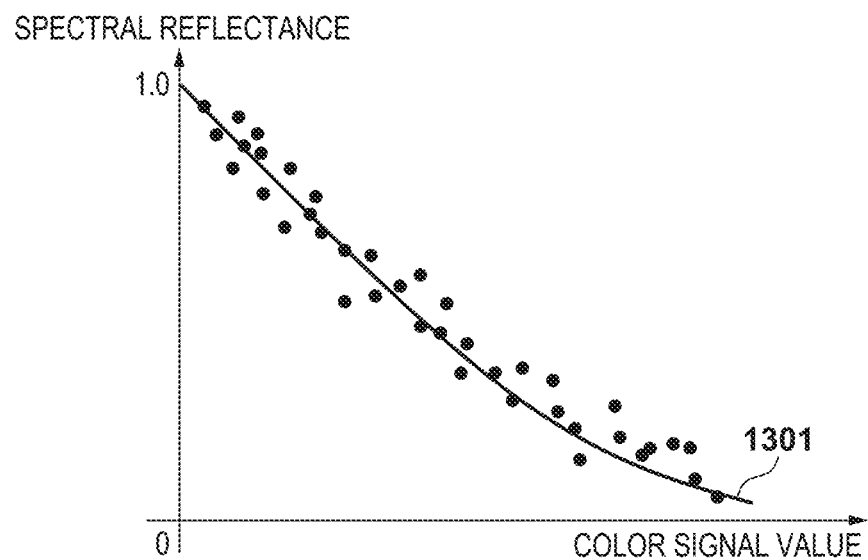
FIG. 13A is a flowchart illustrating correction table modification processing according to the first embodiment.
Figure 13B:
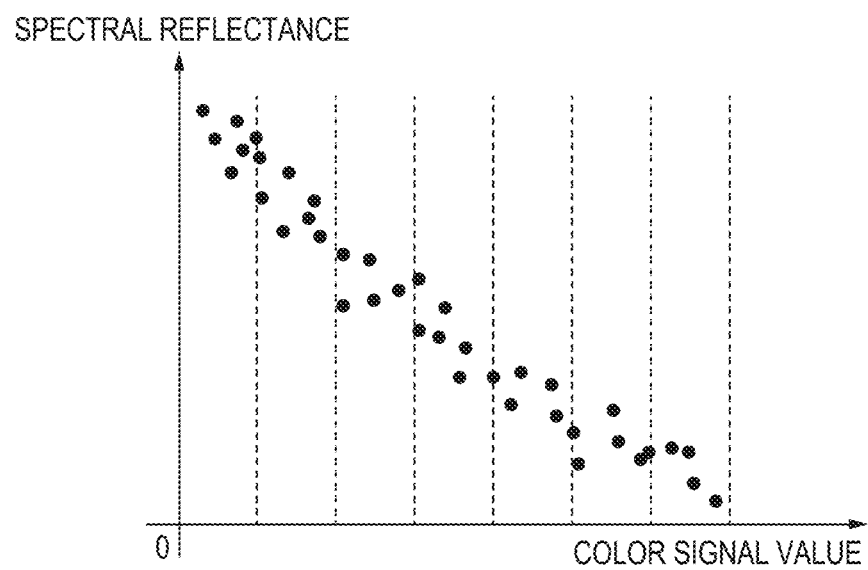
FIG. 13B is a flowchart illustrating correction table modification processing according to the first embodiment.

The modification processing of the correction table 407 in step S1104 will be described in detail with reference to FIGS. 13A to 13C. FIG. 13A is a diagram in which a relationship between the reflectance at each pixel position (x,y) estimated in step S1103 and the correction value out of the color signal obtained by the correction processing unit 402 is plotted. Note that in FIG. 13A, the horizontal axis represents the color signal value of one of the CMY inks, and the vertical axis represents one of the estimated reflectances $\rho_c$, $\rho_m$, and $\rho_y$ of each ink. Curve 1301 in FIG. 13A is a curve representing the ink characteristics of the head module or nozzle, calculated on the basis of each point where the relationship between the spectral reflectance and the color signal value is plotted.

Curve 1301 is obtained, for example, by interpolating each point with a polynomial function obtained through the least-squares method. Alternatively, an interpolation operation can be performed on a reflectance obtained by averaging each point of the color signal values within a section in which the color signal values are segmented at a predetermined interval, and a representative value of the color signal value corresponding thereto, as illustrated in FIG. 13B. Curve 1302 in FIG. 13C is a curve that approximates continuous values obtained by interpolating each point in FIG. 13B. For example, segmented linear interpolation, a spline curve, and the like may be used to interpolate the continuous values. After obtaining the ink characteristics of all the head modules or nozzles, the correction table 407 is generated in the same manner as the correction table generation processing performed in step S706 and illustrated in FIG. 6. The present embodiment makes it possible to use the newly-obtained correction table as the modified correction table 407.

Note that the characteristic obtainment chart 800 is not limited to the chart illustrated in FIG. 8, and for example, nine uniform patterns corresponding to values (0, 32, 64, . . . , 224, 255) that evenly divide the value range (0 to 255) of the color signal may be provided as uniform patterns. The patterns for detecting discharge failure nozzles is not limited to the line charts indicated by pattern 805 and pattern 810 in FIG. 8, and may be any publicly-known discharge failure nozzle detection patterns. Alternatively, a case where a difference between the average values of color signals obtained by scanning a tone pattern of each color and the color signal value measured at the pixel position exceeds a threshold may serve as a reference for detecting the discharge failure nozzle. Alternatively, discharge failure nozzles may be detected by visually confirming the tone pattern of each color.

In the example illustrated in FIG. 8, a pattern of each ink color corresponding to the recording heads 201 to 204, respectively, is formed on a single recording medium, but the configuration may be such that a different recording medium is recorded onto by each recording head. In other words, instead of recording the blocks 801 to 804 onto a single sheet of recording paper, each block may be recorded onto different sheets of recording paper. Note that the method of forming the pattern of each ink color on the same recording paper is advantageous in that errors caused by the lot of recording paper and skew in the paper transport by the transport roller 205 can be reduced. It is therefore preferable that all patterns of each ink color be recorded on the same recording paper to the greatest extent possible.

In the present embodiment, the ink characteristics, the estimation processing order of ink colors, the estimated wavelength, the target characteristics of the ink colors, and the ink color correction table are obtained on the basis of the characteristic obtainment chart 800, but a different characteristic obtainment chart 800 may be used depending on the items to be obtained. For example, the obtainment of the ink characteristics and the generation of the correction table may be performed using a different number of uniform color patterns pertaining to the inks in the characteristic obtainment chart 800. Alternatively, the characteristic obtainment chart 800 may be formed using only a single head module to eliminate the influence of overlapping parts between head modules in the same recording head. Alternatively, a characteristic obtainment chart 800 in which no boundaries are provided between head modules may be used.

Note that the present embodiment may execute filter processing in a two-dimensional plane, represented by x and y, on the spectral reflectance $\rho_x(x,y,\lambda)$ of the formed image 400 obtained by the image obtainment unit 108. In the present embodiment, when, for example, correcting each ink color on a nozzle-by-nozzle basis, if filter processing equivalent to the visual transfer function (VTF) that represents human vision characteristics is performed on the formed image 400, unevenness in frequency bands easily visible to the user can be corrected preferentially. Additionally, in the present embodiment, a plurality of processing orders 4053 and selected wavelengths 4054 may be provided in the estimation parameter setting unit 404 on the basis of the differences in the spectral reflectance characteristics of each ink color in each wavelength range. In the present embodiment, by preparing a plurality of estimation processing orders and corresponding estimated wavelengths for estimating each ink color in advance, the estimation processing can be continued even when, for example, the reflectances of both K ink and C ink are not approximately 1.0. According to the present embodiment, the reflectance of each ink color can be calculated accurately even when there are no differences in the spectral reflectance characteristics of the wavelength range among the inks.

Figures 13C, 14:
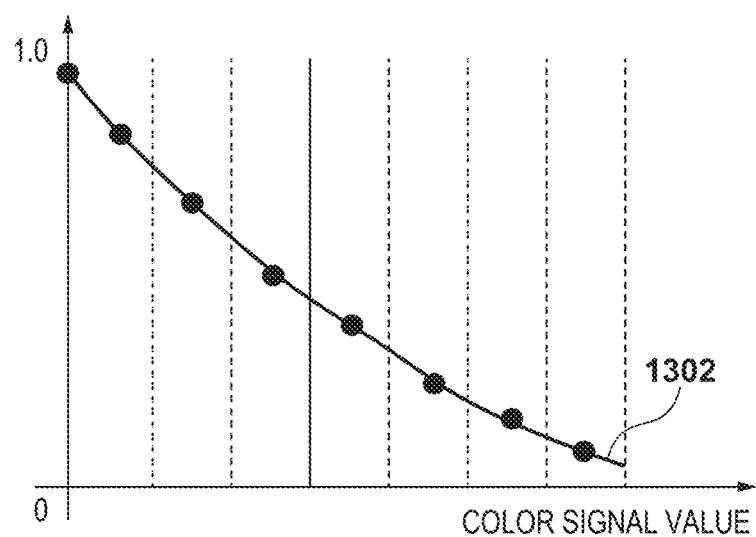
FIG. 13C is a flowchart illustrating correction table modification processing according to the first embodiment.
FIG. 14 is a diagram illustrating an example of a spectral reflectance classification table according to the first embodiment.

FIG. 14 illustrates, for example, the ink characteristics of the CMYK colors obtained in step S702. In FIG. 14, the vertical axis represents CMYK, which are the ink colors, and the horizontal axis represents a segment of the wavelength range, where the unit of the wavelength range is nm. In FIG. 14, Excellent indicates sensitivity to ink reflectance in the wavelength range, and Poor indicates no sensitivity to ink reflectance in the wavelength range. For example, the wavelength range of 430-480 nm for C ink has Excellent, which indicates that the reflectance of C ink has sensitivity in that wavelength range. On the other hand, the wavelength range of 380-430 nm for C ink has Poor, which indicates the reflectance of C ink has no sensitivity in that wavelength range. In FIG. 14, the first-order color estimation unit 4051 can estimate the reflectance of each ink in the following three processing orders on the basis of the classification of the reflectance sensitivity in each wavelength range for each ink. For example, a first processing order is K ink (corresponding to a wavelength of 500 nm), Y ink (corresponding to a wavelength of 450 nm), and C ink (corresponding to a wavelength of 700 nm). A second processing order is K ink (corresponding to a wavelength of 700 nm), M ink (corresponding to a wavelength of 550 nm), and Y ink (corresponding to a wavelength of 400 nm). A third processing order is C ink (corresponding to a wavelength of 700 nm), M ink (corresponding to a wavelength of 550 nm), and Y ink (corresponding to a wavelength of 400 nm). The wavelengths listed as a set with each ink in the foregoing indicate the estimated wavelengths for uniquely estimating each ink. The first-order color estimation unit 4051 can change the estimation processing order for each ink color and the corresponding estimated wavelength according to the mixed colors present in the formed image 400 and the reflectance of each ink contained therein. Through this, the present embodiment can estimate the reflectance for many ink color combinations.

In the estimation of the reflectance of each ink, the estimated wavelength for specifying each ink color is selected after determining the estimation processing order for each ink color. However, the estimation processing for each ink color and the corresponding selection of the estimated wavelength may be determined at the same time. For example, all combinations of the estimation processing orders and corresponding estimated wavelengths for each ink may be determined on the basis of the product of the reflectances at the estimated wavelengths for the inks aside from the ink that is ultimately selected. The combination of the wavelength having the largest product of the reflectances in the estimated wavelength of each ink, and the corresponding estimation processing order for each color, may then be employed. Finding the estimation processing order of each ink and the corresponding estimated wavelength at the same time in this manner does require more time to determine the reflectance of each ink, but doing so makes it possible to calculate a more accurate reflectance for each ink. Note that the target setting unit 408 and the target characteristics 409 are absolutely necessary if a predetermined nozzle or module unit, or an average value for the nozzles and head modules, is used as a reference in target settings for the ink characteristics. For example, the reflectance of each module represented by curve 1301 in FIG. 13A, which is calculated by the correction table generation unit 406 in step S1103, may be set as the target characteristics. Although the present embodiment uses spectral reflectance as an indicator for evaluating the ink characteristics, spectral density may also be used, for example.

As described thus far, according to the first embodiment, a first wavelength range in which a plurality of first spectral reflectances are lower than a plurality of second spectral reflectances, and a second wavelength range in which the plurality of first spectral reflectances are higher than the plurality of second spectral reflectances, can be determined. According to the first embodiment, a first halftone dot associated with one first spectral reflectance selected from among the plurality of first spectral reflectances in accordance with a matching rate of a mixed spectral reflectance in the first wavelength range can be estimated. According to the first embodiment, a third spectral reflectance can be obtained by dividing the mixed spectral reflectance by the selected first spectral reflectance. According to the first embodiment, a second halftone dot associated with one second spectral reflectance selected from among the plurality of second spectral reflectances in accordance with a matching rate of the third spectral reflectance in the second wavelength range can be estimated. Through this, the estimation time for estimating a recording amount for each of colors in an image containing a plurality of colors can be shortened, and the accuracy of color stabilization processing can be improved.

Second Embodiment

The following second embodiment will describe differences from the first embodiment. In the first embodiment, the estimation order and corresponding estimated wavelength that can be calculated exclusively for each ink were determined in advance on the basis of the differences in spectral reflectance characteristics for each ink in each wavelength range. By doing so, the first embodiment can calculate the reflectance of each ink in a mixed region where a plurality of ink colors are mixed faster than in the past. However, there are cases where inks are used in combination with each other where there is no wavelength range in which the spectral reflectance of each ink present in the mixed region can be determined uniquely. One such case is, for example, two ink colors in which one ink color has sensitivity in the wavelength range where the other ink color has only a slight sensitivity (i.e., the reflectance is not 1.0). In this case, the spectral reflectance of the one ink color cannot be determined uniquely because the influence of the spectral reflectance of the other ink color cannot be eliminated.

Figure 15C:
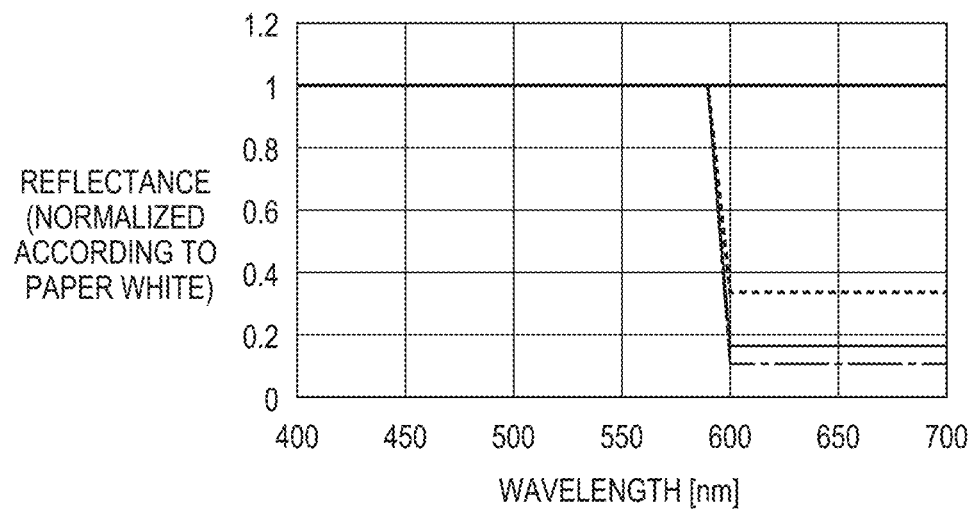
FIG. 15C is a diagram illustrating first-order color estimation processing according to the second embodiment.
Figure 15D:
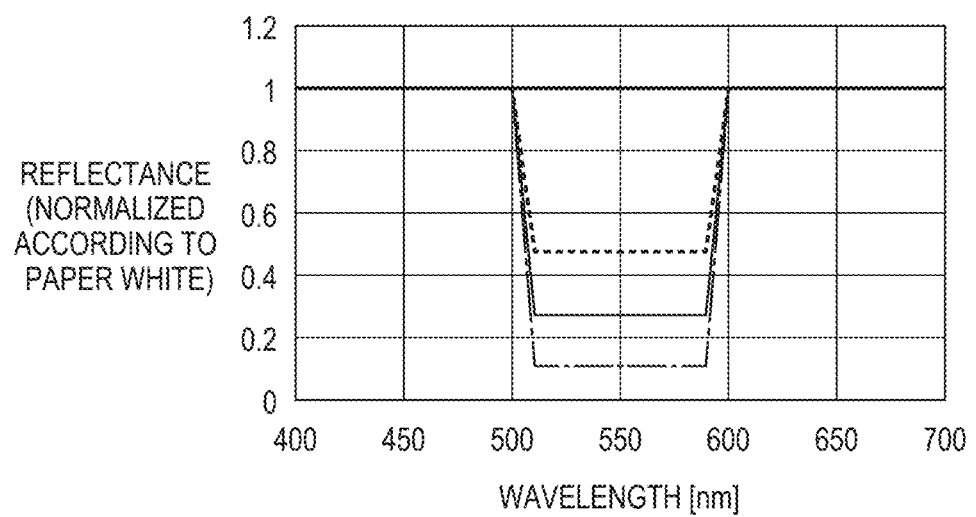
FIG. 15D is a diagram illustrating first-order color estimation processing according to the second embodiment.
Figure 15E:
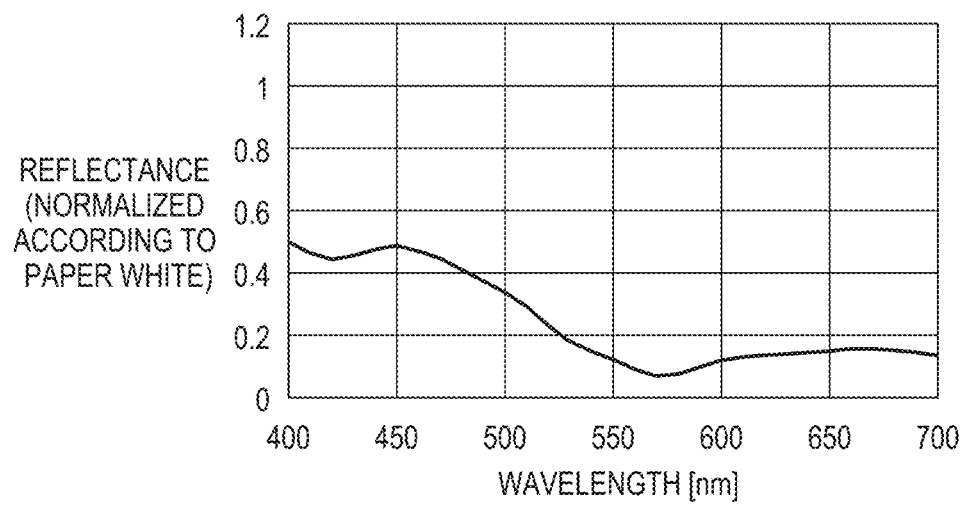
FIG. 15E is a diagram illustrating first-order color estimation processing according to the second embodiment.

FIGS. 15A to 15F illustrate processing for estimating a first-order color according to the present embodiment. FIG. 15A illustrates the spectral reflectance relative to wavelength for C ink. FIG. 15B illustrates the spectral reflectance relative to wavelength for M ink. FIG. 15E illustrates the spectral reflectance relative to wavelength for mixed ink. Returning to the above descriptions, for the spectral reflectances of C ink and M ink illustrated in FIGS. 15A and 15B, respectively, there is no wavelength range where the spectral reflectances of both inks are approximately 1.0. Additionally, to estimate the reflectance of C ink and M ink respectively, there is a method of estimating the reflectance of each ink by approximating the spectral reflectance of the wavelength range of either C ink or M ink as 1.0. However, the estimation of the reflectance of each ink through this method contains errors due to the approximation, which may produce even more density unevenness.

Figure 15F:
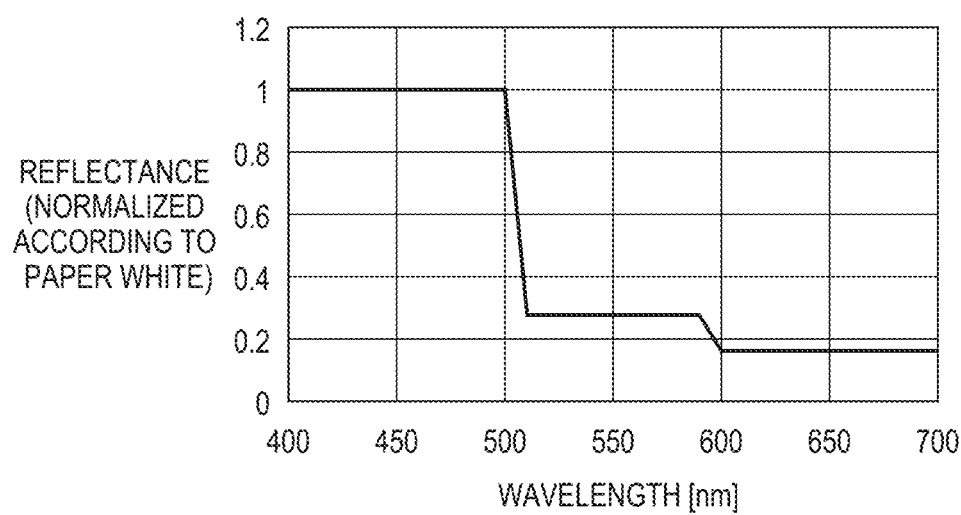
FIG. 15F is a diagram illustrating first-order color estimation processing according to the second embodiment.

On the other hand, when estimating the reflectance of each ink without using a reflectance approximation, it is necessary to estimate the reflectances at the same time while considering the spectral reflectance of each ink, and thus the calculations take time. Accordingly, in the present embodiment, the spectral reflectance of each ink that has already been obtained is converted into a virtual ink that has reflectance only in a predetermined wavelength range. The virtual ink will be described in detail later. FIG. 15C illustrates the spectral reflectance relative to wavelength for virtual C ink. FIG. 15D illustrates the spectral reflectance relative to wavelength for virtual M ink. FIG. 15F illustrates the spectral reflectance relative to wavelength for virtual mixed ink. The virtual C ink in FIG. 15C illustrates that the ink has sensitivity (i.e., the reflectance is approximately 1.0) only in a predetermined wavelength range, e.g., greater than or equal to 600 nm. Likewise, the virtual M ink in FIG. 15D illustrates that the ink has sensitivity (i.e., the reflectance is approximately 1.0) only in a wavelength range of 500 to 600 nm, which is different from the virtual C ink. The method of obtaining virtual mixed ink, virtual C ink, and virtual M ink will be described hereinafter.

First, a matrix that simultaneously converts the spectral reflectance of C ink to the spectral reflectance of virtual C ink and the spectral reflectance of M ink to the spectral reflectance of virtual M ink is calculated. In the present embodiment, the reflectance of each ink in the mixed region is calculated quickly by using the obtained conversion matrix. FIG. 15E illustrates, for example, the spectral reflectance of a mixed region containing C ink and M ink. Here, the spectral reflectance illustrated in FIG. 15F is obtained by converting the spectral reflectance of the mixed region using the stated conversion matrix. FIG. 15F illustrates a mixed virtual spectral reflectance where the spectral reflectance of the virtual C ink and the virtual M ink are mixed. Accordingly, the reflectance at wavelengths of 550 nm and 650 nm, for example, is focused on in FIGS. 15D and 15F. As in the first embodiment, the reflectances of the virtual C ink and the virtual M ink can be uniquely calculated according to a monotonically decreasing relationship in which the reflectance of C or M ink decreases as the halftone dot ratio of C or M ink increases.

The halftone dot ratio of each ink in the mixed region can be corrected quickly on the basis of the virtual C ink and virtual M ink obtained. The following will describe an example of performing correction on the basis of spectral density rather than spectral reflectance. Spectral density has a higher linearity with respect to the halftone dot ratio of each ink than spectral reflectance, and this reduces errors in the calculation of the matrix (described later).

Figure 16:
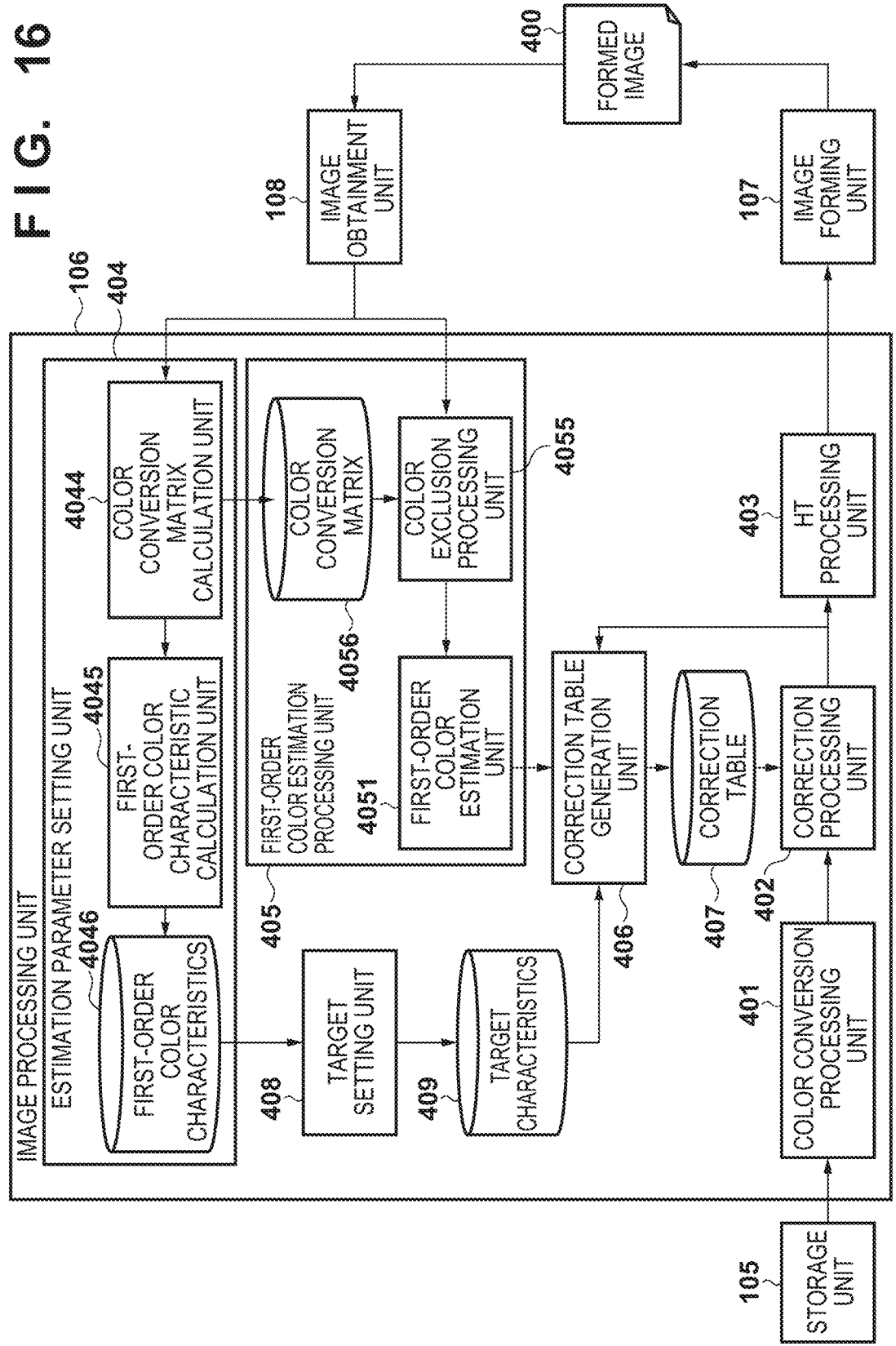
FIG. 16 is a function block diagram illustrating an image processing unit according to the second embodiment.

FIG. 16 illustrates function blocks of the image processing unit 106 according to the second embodiment. The functional configuration of the image processing unit 106, which executes the estimation processing using virtual ink, will be described next with reference to FIG. 16. Configurations that are the same as those in the first embodiment will be given the same reference signs, and will not be described. In FIG. 16, the image processing unit 106 includes the color conversion processing unit 401, the correction processing unit 402, the HT processing unit 403, and the estimation parameter setting unit 404. The image processing unit 106 also includes the first-order color estimation processing unit 405, the correction table generation unit 406, the correction table 407, the target setting unit 408, and the target characteristics 409. Furthermore, the estimation parameter setting unit 404 is configured including a color conversion matrix calculation unit 4044, a first-order color characteristic calculation unit 4045, and first-order color characteristics 4046. The first-order color estimation processing unit 405 is configured including the first-order color estimation unit 4051, a color exclusion processing unit 4055, and a color conversion matrix 4056.

Figure 17:
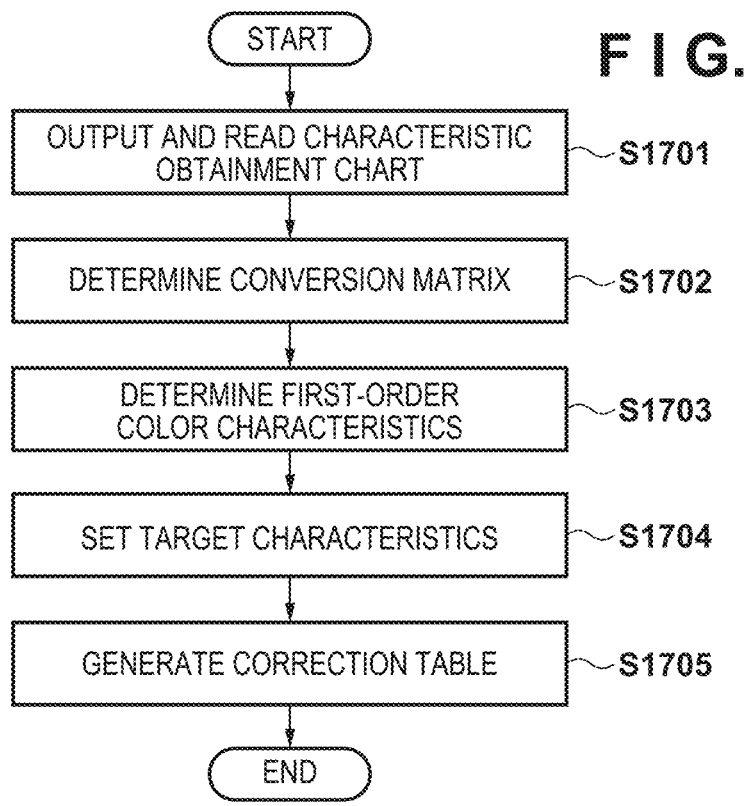
FIG. 17 is a flowchart illustrating advance setting processing according to the second embodiment and a third embodiment.

The image forming system 10 according to the present embodiment performs various types of settings before an image is printed by the user. The various types of settings include, specifically, the setting of parameters necessary for the estimation processing by the first-order color estimation processing unit 405, the setting of target characteristics in the generation of the correction table, and the generation of the correction table. FIG. 17 illustrates a flow of advance settings according to the present embodiment. Each step of the advance settings flow will be described hereinafter with reference to FIG. 17. First, in step S1701, the image processing unit 106 outputs the characteristic obtainment chart 800, and reads the output result, to calculate the setting parameters. The present embodiment can use the same characteristic obtainment chart 800 as that used in the first embodiment. Next, in step S1702, the color conversion matrix calculation unit 4044 calculates the color conversion matrix 4056 for converting the spectral density of each ink color to a virtual spectral density. For example, the color conversion matrix 4056 can be calculated as a conversion matrix X in which the error is minimized, according to the following Formula 8.

$$\begin{bmatrix} d_{(vc,380)} & d_{(vc,390)} & d_{(vc,400)} & \cdots & d_{(vc,720)} & d_{(vc,730)} \\ d_{(vm,380)} & d_{(vm,390)} & d_{(vm,400)} & \cdots & d_{(vm,720)} & d_{(vm,730)} \\ d_{(vy,380)} & d_{(vy,390)} & d_{(vy,400)} & \cdots & d_{(vy,720)} & d_{(vy,730)} \\ d_{(vk,380)} & d_{(vk,390)} & d_{(vk,400)} & \cdots & d_{(vk,720)} & d_{(vk,730)} \end{bmatrix} = \begin{bmatrix} d_{(c,380)} & d_{(c,390)} & d_{(c,400)} & \cdots & d_{(c,720)} & d_{(c,730)} \\ d_{(m,380)} & d_{(m,390)} & d_{(m,400)} & \cdots & d_{(m,720)} & d_{(m,730)} \\ d_{(y,380)} & d_{(y,390)} & d_{(y,400)} & \cdots & d_{(y,720)} & d_{(y,730)} \\ d_{(k,380)} & d_{(k,390)} & d_{(k,400)} & \cdots & d_{(k,720)} & d_{(k,730)} \end{bmatrix} X \quad \text{(Formula 8)}$$

Here, $d(x,\lambda)$ on the right side of Formula 8 represents the spectral density of ink x at wavelength $\lambda$(nm). The spectral density is calculated by converting the spectral reflectance $\rho(x,\lambda)$ for the highest color signal 255 by $d=\log 10(1/p)$. Note that the ink x may be any of the CMYK inks, as an example of the present embodiment. The range of the wavelength $\lambda$ includes the visible light range, e.g., wavelengths of 380 to 730 nm, and the wavelength $\lambda$ is indicated for every 10 nm.

Figure 18:
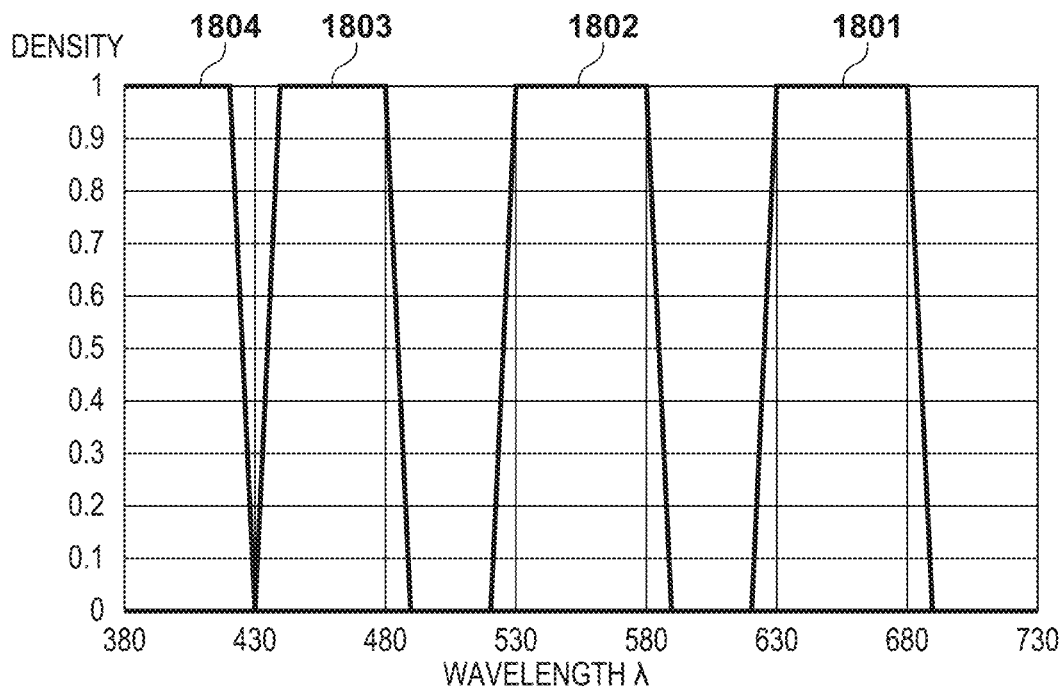
FIG. 18 is a diagram illustrating an example of first-order color virtual spectral density according to the second embodiment.

FIG. 18 illustrates the spectral density of each virtual ink with respect to the wavelength. FIG. 18 illustrates, for example, that if density 1801 is a spectral density $d(v_c,\lambda)$ of the virtual C ink, then only the wavelength band corresponding to $\lambda$=630 to 680 nm is 1.0, and the spectral density is 0 in the other wavelength ranges. In FIG. 18, density 1802 may be set as the spectral density of the virtual M ink, density 1803 may be set as the spectral density of the virtual Y ink, and density 1804 may be set as the spectral density of the virtual K ink. Returning to the description of Formula 8, $d(v_x,\lambda)$ on the left side represents the virtual spectral density of each ink, e.g., the spectral density as indicated by densities 1801 to 1804.

The conversion matrix X obtained as described above is held in the first-order color estimation processing unit 405 as the color conversion matrix 4056, and is used in the first-order color estimation processing described later. Returning to the description of the flow in FIG. 17, in step S1703, the first-order color characteristic calculation unit 4045 obtains the spectral density for the case of conversion to the virtual CMYK ink corresponding to each CMYK ink. FIGS. 19A and 19B illustrate spectral density characteristics with respect to color signal values. Specifically, a relationship between the color signal value of each ink and a virtual ink density d corresponding to that ink is obtained as indicated by curve 1901 in FIG. 19A. The first-order color characteristic calculation unit 4045 calculates, for example, a virtual C ink density d_c at 630 to 680 nm for the virtual C ink with respect to the C ink color signal value.

The first-order color characteristic calculation unit 4045 performs a logarithmic conversion of the spectral reflectance $\rho(k_c,\lambda)$ of C ink obtained on the basis of the uniform patches of patterns 806 to 809 in FIG. 8 to obtain curve 1901. This makes it possible for the first-order color characteristic calculation unit 4045 to obtain the spectral density $d(c,\lambda)$ with respect to the halftone dot ratio $k_c$ of C ink. In addition, the first-order color characteristic calculation unit 4045 can obtain the spectral density $d(v_c,\lambda)$ of the virtual C ink with respect to the halftone dot ratio $k_c$ of C ink by converting the spectral density $d(c,\lambda)$ using the conversion matrix X. The first-order color characteristic calculation unit 4045 then obtains the virtual C ink density d_c by averaging the obtained spectral density $d(v_c,\lambda)$ over the wavelength range having sensitivity (630 to 680 nm). Note that for the wavelength range (630 to 680 nm), the wavelength range where 1.0, i.e., the spectral density of the virtual C ink corresponding to the highest color signal 255 illustrated in FIG. 18, is obtained. By interpolating the obtained plot of the virtual C ink density d_c and the color signal value used to calculate that density using a publicly-known interpolation method, curve 1901, which represents the correspondence between the color signal values and the spectral density illustrated in FIG. 19A, is obtained.

Returning to FIG. 17, in step S1704, the target setting unit 408 determines the target characteristics 409 on the basis of the first-order color characteristics 4046. The target setting unit 408 can, for example, determine the target characteristics through linear interpolation of the color signal value and the spectral density, as indicated by straight line 1902 in FIG. 19A. Alternatively, the target setting unit 408 may use the target characteristics of one of the modules or the nozzles as a reference, and the first-order color characteristics 4046 of the module or nozzle serving as the reference may be used as the target characteristics. In step S1705, the correction table generation unit 406 generates the correction table 407 on the basis of the first-order color characteristics 4046 and the target characteristics 409. The correction table generation unit 406 calculates a target density d_t corresponding to the input color signal value In on straight line 1902, which represents the target characteristics in FIG. 19A. The correction table generation unit 406 obtains a color signal value out corresponding to the target density d_t on curve 1901, which represents the first-order color characteristics, as the correction value. Through this, the correction table generation unit 406 can generate the correction table 407 by holding, in the storage unit 105, information associating the obtained correction value out with the input color signal value In.

Figure 20:
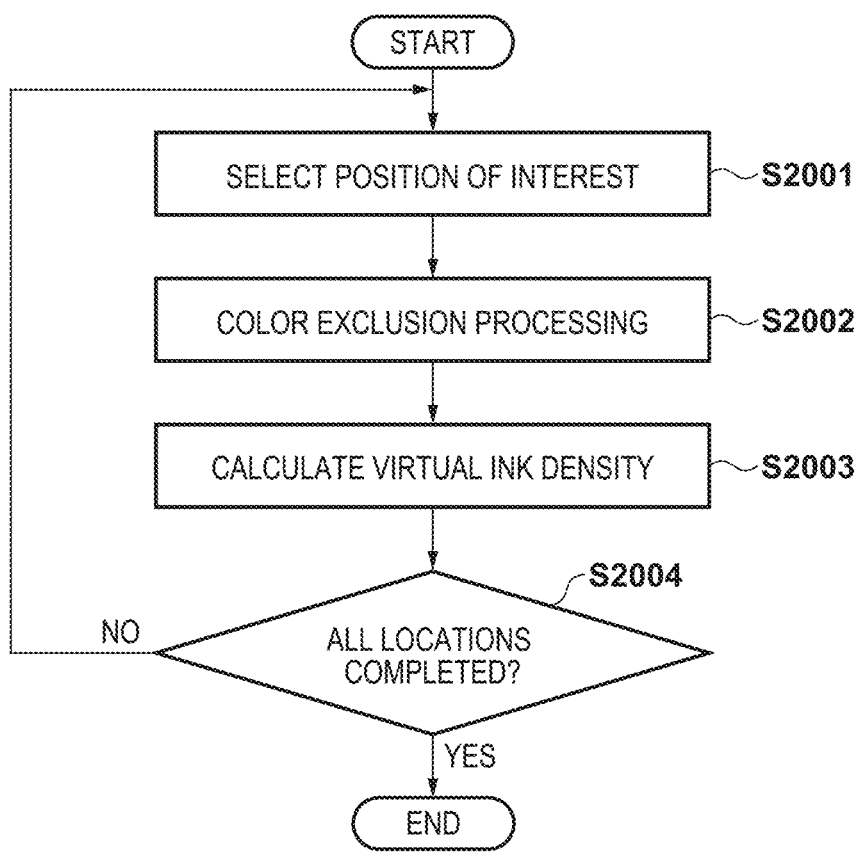
FIG. 20 is a flowchart illustrating image printing processing according to the second embodiment.

The flow of printing an image by the user follows the flow illustrated in FIG. 11. FIG. 20 is a flow illustrating image printing processing according to the present embodiment. The first-order color estimation in step S1103 of FIG. 11 will be described in detail hereinafter with reference to FIG. 20. First, in step S2001, the color exclusion processing unit 4055 determines a pixel position $(x_i, y_i)$ for estimating the first-order color. The color exclusion processing unit 4055 obtains the mixed spectral reflectance $\rho_x(x_i, y_i, \lambda)$ at the pixel position where, for example, $x_i = 0$ and $y_i = 0$. Next, in step S2002, the first-order color estimation unit 4051 calculates the mixed spectral density $d(\lambda)$ by performing a logarithmic conversion on the mixed spectral reflectance $\rho_x(x_i, y_i, \lambda)$. Furthermore, the first-order color estimation unit 4051 obtains a mixed virtual spectral density $d'(\lambda)$ by referring to the color conversion matrix 4056 and converting the mixed spectral density $d(\lambda)$ using the conversion matrix X. The mixed virtual spectral density $d'(\lambda)$ is also called the "mixed virtual spectral density".

In step S2003, the first-order color estimation unit 4051 calculates each virtual ink density on the basis of the converted mixed virtual spectral density $d'(\lambda)$. The first-order color estimation unit 4051 can use the average value of the spectral density $d'(\lambda)$ in the wavelength range of 630 to 680 nm as the virtual C ink density. The first-order color estimation unit 4051 can also estimate the average value of the spectral density $d'(2)$ in the wavelength range of 530 to 580 nm as the density of the virtual M ink. The first-order color estimation unit 4051 can estimate the average value of the spectral density $d'(?)$ in the wavelength range of 430 to 480 nm as the density of the virtual Y ink. The first-order color estimation unit 4051 can estimate the average value of the spectral density $d'(\lambda)$ in the wavelength range of 380 to 430 nm as the density of the virtual K ink. In step S1207, the first-order color estimation unit 4051 determines whether or not the virtual ink density has been estimated at all pixel positions $(x_i, y_i)$. If all the virtual ink densities have been estimated, the first-order color estimation processing ends (Yes in step S2004). If not all virtual ink densities have been estimated, the processing returns to step S1201, where the color exclusion processing unit 4055 selects an unprocessed pixel position as a new pixel position (No in step S2004).

A procedure for updating the correction table 407 in step S1104 will be described hereinafter. In the present embodiment, the correction table 407 is calculated on the basis of each virtual ink density at each pixel position (x,y) estimated in step S2003, and the color signal value subject to correction processing obtained from the correction processing unit 402. FIG. 19B is a diagram in which the virtual ink density is plotted against the color signal value of the head module or nozzle subject to correction. In FIG. 19B, the horizontal axis represents one of the color signal values CMYK, and the vertical axis represents one of the estimated virtual ink densities $v_c$, $v_m$, $v_y$, or $v_k$ corresponding to the color signal value. Curve 1903 in FIG. 19B is a curve representing the ink characteristics of the head module or nozzle, calculated on the basis of each point where the virtual ink density corresponding to the color signal value is plotted.

Curve 1901 is obtained, for example, by interpolating each point with a polynomial function obtained through the least-squares method. Alternatively, an interpolation operation can be performed on a spectral density obtained by averaging each point of the color signal values within a section in which the color signal values are segmented at a predetermined interval, and a representative value of the color signal value corresponding thereto. Continuous values may be obtained by performing interpolation operations on the representative values in each segment. After obtaining each spectral density, the correction table 407 is generated for all head modules or nozzles in the same manner as the processing in step S1705 and illustrated in FIG. 19A. The present embodiment makes it possible to use the newly-obtained correction table as the modified correction table 407.

As described above, the spectral density $d'(\lambda)$ is obtained by converting the mixed spectral density $d(\lambda)$ obtained from the spectral reflectance $\rho_x(x_i, y_i, \lambda)$ using a conversion matrix. When calculating the ink characteristics of each head module or each nozzle as indicated in FIGS. 19A and 19B, the average value of the mixed spectral density $d(\lambda)$ at a wavelength of 630 to 680 nm is used to calculate the spectral density of C ink, for example. At this time, instead of calculating the spectral density $d'(\lambda)$ using a conversion matrix, a conversion matrix that directly converts to the virtual ink density used to calculate each of the ink characteristics may be used. In this case, in step S1702, the color conversion matrix calculation unit 4044 may calculate a conversion matrix X that satisfies the following Formula 9. Here, $V_c$, $V_m$, $V_y$, and $V_k$ on the left side of Formula 9 represent the virtual ink densities for calculating the ink characteristics. Alternatively, the following Formula 10 may be used to calculate the virtual ink density.

$$\begin{bmatrix} V_c & 0 & 0 & 0 \\ 0 & V_m & 0 & 0 \\ 0 & 0 & V_y & 0 \\ 0 & 0 & 0 & V_k \end{bmatrix} = \qquad \text{(Formula 9)}$$

$$\begin{bmatrix} d_{(c,380)} & d_{(c,390)} & d_{(c,400)} & \cdots & d_{(c,720)} & d_{(c,730)} \\ d_{(m,380)} & d_{(m,390)} & d_{(m,400)} & \cdots & d_{(m,720)} & d_{(m,730)} \\ d_{(y,380)} & d_{(y,390)} & d_{(y,400)} & \cdots & d_{(y,720)} & d_{(y,730)} \\ d_{(k,380)} & d_{(k,390)} & d_{(k,400)} & \cdots & d_{(k,720)} & d_{(k,730)} \end{bmatrix} X$$

$$\begin{bmatrix} V_c & 0 & 0 \\ 0 & V_m & 0 \\ 0 & 0 & V_y \end{bmatrix} = \qquad \text{(Formula 10)}$$

$$\begin{bmatrix} d_{(c,380)} & d_{(c,390)} & d_{(c,400)} & \cdots & d_{(c,720)} & d_{(c,730)} \\ d_{(m,380)} & d_{(m,390)} & d_{(m,400)} & \cdots & d_{(m,720)} & d_{(m,730)} \\ d_{(y,380)} & d_{(y,390)} & d_{(y,400)} & \cdots & d_{(y,720)} & d_{(y,730)} \end{bmatrix} X$$

Formula 10 can be used to calculate the virtual ink density in a mixed region where K ink is not mixed, in the same manner as in the first embodiment. Alternatively, at least one of the virtual ink densities $V_c$, $V_m$, and $V_y$ may be calculated on the basis of the number and type of mixed colors generated by the combinations of the ink colors, and the K ink may be calculated using the calculated virtual ink density. The right sides of Formula 8, Formula 9, and Formula 10 contain only first-order terms for the spectral density $d(\lambda)$ of each ink color, but if error between the left side and the right side in each formula is high, additional second-order and third-order terms may be added to the spectral density $d(\lambda)$ on the right side. For example, a conversion matrix X that minimizes error between the left side and the right side may be used by using the following Formula 11, which adds a second-order term to the right side of Formula 10.

$$\begin{bmatrix} V_c & 0 & 0 & 0 \\ 0 & V_m & 0 & 0 \\ 0 & 0 & V_y & 0 \\ 0 & 0 & 0 & V_k \end{bmatrix} = \qquad \text{(Formula 11)}$$

$$\begin{bmatrix} d_{(c,380)} & d_{(c,390)} & \cdots & d_{(c,730)} & d_{(c,380)} & \cdots & d_{(c,730)}^2 \\ d_{(m,380)} & d_{(m,390)} & \cdots & d_{(m,730)} & d_{(m,380)} & \cdots & d_{(m,730)}^2 \\ d_{(y,380)} & d_{(y,390)} & \cdots & d_{(y,730)} & d_{(y,380)} & \cdots & d_{(y,730)}^2 \\ d_{(k,380)} & d_{(k,390)} & \cdots & d_{(k,730)} & d_{(k,380)} & \cdots & d_{(k,730)}^2 \end{bmatrix} X$$

Although the present embodiment uses the spectral density d(λ) corresponding to the color signal values illustrated in FIGS. 19A and 19B as the ink characteristics, indicators such as reflectance, the distance D from paper white, optical density, and the like, illustrated in FIG. 10A, may be used instead of spectral density. At this time, the ink characteristics are calculated using a LUT or a function that defines a relationship between the virtual ink density and one of reflectance, the distance D, or optical density in advance, with the virtual ink density serving as a parameter. The virtual ink may be based on the Lambert rule, which states that the thickness or amount of each ink is always proportional to the optical density thereof. The ink characteristics can be calculated more quickly even when a virtual ink is defined and used as a parameter in this manner. Incidentally, in steps S1703 and S2003, real ink and virtual ink are associated in a one-to-one relationship, but one virtual ink density may be associated with a plurality of real ink densities. For example, a conversion table that converts the virtual C ink density per pixel unit to each of real ink CMY densities is held in advance. The density of each ink converted using the conversion table may be used as the ink characteristics.

Specifically, a conversion table that associates a virtual C ink density of 0.1 with a corresponding conversion amount, e.g., a halftone dot ratio of 10% for C ink and a halftone dot ratio of 8% for M ink, is held in the storage unit 105. At this time, if the virtual C ink density calculated in step S2003 is 0.3, a halftone dot ratio of C ink of 30% is obtained on the basis of a density ratio of the virtual C ink (calculated value 0.3/reference value 0.1) and a conversion amount (a halftone dot ratio of 10% for a virtual C ink density of 0.1). When the virtual C ink density is 0.3, a halftone dot ratio of 24% is obtained for M ink through the same calculation method as that described above. The calculation of the halftone dot ratio of C ink based on the virtual C ink density has been described here, but assume further that the halftone dot ratio of C ink calculated on the basis of the virtual M ink density is obtained at 5% and the halftone dot ratio of C ink calculated on the basis of the virtual K ink density is obtained at 6%. At this time, the total halftone dot ratio of C ink is obtained as 41%, which is the sum of 30%, 5%, and 6%. The sum of the halftone dot ratios of each ink obtained in this manner may be used as the ink characteristics.

As described above, according to the second embodiment, a conversion matrix that eliminates a plurality of second spectral reflectances in a first wavelength range and also eliminates a plurality of first spectral reflectances in a second wavelength range can be obtained. According to the second embodiment, the plurality of first spectral reflectances in a part of the first wavelength range can be converted into a plurality of first virtual spectral reflectances. According to the second embodiment, the plurality of second spectral reflectances in a part of the second wavelength range can be converted into a plurality of second virtual spectral reflectances. According to the second embodiment, a mixed spectral reflectance in a part of the first wavelength range and a part of the second wavelength range can be converted into a first mixed virtual reflectance and a second mixed virtual reflectance, respectively. Through this, the estimation time for estimating a recording amount for each of colors in an image containing a plurality of colors can be shortened, and the accuracy of color stabilization processing can be improved.

Third Embodiment

In the first embodiment and the second embodiment, the spectral reflectance of each formed image 400 can be obtained by the image obtainment unit 108. However, spectral sensors require a longer time to obtain image data than, for example, a typical RGB sensor. Accordingly, the time required to obtain the spectral reflectance is longer than the time required to calculate each instance of ink characteristics (e.g., the halftone dot ratio) from the mixed region, and the time required by the spectral sensor to obtain the image data acts as a constraint when setting the color correction interval. In addition, due to cost constraints, the range over which the image data can be obtained by the spectral sensor may be limited to only a part of the paper surface, rather than the entire paper surface width. Accordingly, the present embodiment will describe an example of using an image obtainment unit 108 that includes a spectral sensor as well as an RGB sensor that covers the entire paper surface width. The third embodiment will be described next, focusing on differences from the first embodiment and the second embodiment.

In the present embodiment, a matrix that associates output values read from the image by the RGB sensor (RGB values) to the spectral reflectance at each wavelength obtained by the spectral sensor is generated before an image is printed by the user. In the present embodiment, the correction table 407 is corrected on the basis of the RGB values of the read image and the matrix. Advance settings may be performed on the basis of the flow illustrated in FIG. 17. The advance settings will be described hereinafter with reference to FIG. 17. First, in step S1701, the image processing unit 106 outputs, and then reads, the characteristic obtainment chart 800. In the present embodiment, this includes reading the characteristic obtainment chart 800 using the RGB sensor and the spectral sensor, and obtaining the spectral reflectance p of each ink and each RGB value. Next, in step S1702, the color conversion matrix calculation unit 4044 calculates the color conversion matrix 4056 for converting the RGB values into the spectral reflectance characteristics of each ink.

Specifically, the estimation processing order for each ink color and the estimated wavelengths for estimating each ink are determined on the basis of the differences in the reflectances which differ in each wavelength range by the spectral reflectance characteristics of each ink. These are determined according to steps S702 to S704 in FIG. 7. Furthermore, a C ink reflectance ρ_c(k_c), an M ink reflectance ρ_m(k_m), and a Y ink reflectance ρ_y(k_y) are calculated on the basis of the spectral reflectance of each ink obtained using the estimation processing order of each ink color and the estimated wavelength of each ink. A matrix Y is calculated such that error between reflection characteristics ρ_x(k_x) on the left side and the RGB values on the right side in the following Formula 12 is minimized.

$$\begin{bmatrix} \rho\_c(kc) \\ \rho\_m(km) \\ \rho\_y(ky) \end{bmatrix} = \begin{bmatrix} R(kc) & G(kc) & B(kc) \\ R(km) & G(km) & B(km) \\ R(ky) & G(ky) & B(ky) \end{bmatrix} Y \qquad \text{(Formula 12)}$$

Note that R($k_c$) on the right side of Formula 12 is the output value by an R sensor in the RGB sensor with respect to the halftone dot ratio kc of C ink. Note also that in the present embodiment, a conversion matrix that converts to R'G'B', which are obtained by performing a conversion using a one-dimensional LUT and logarithmic conversion on the RGB values, may be obtained. Additionally, the present embodiment may use a matrix Y constituted by the following Formula 13, instead of the above Formula 12.

$$\begin{bmatrix} \rho\_c(kc) & 1.0 & 1.0 \\ 1.0 & \rho\_m(km) & 1.0 \\ 1.0 & 1.0 & \rho\_y(ky) \end{bmatrix} = \begin{bmatrix} R(kc) & G(kc) & B(kc) & R(kc)^2 & G(kc)^2 & B(kc)^2 \\ R(km) & G(km) & B(km) & R(km)^2 & G(km)^2 & B(km)^2 \\ R(ky) & G(ky) & B(ky) & R(ky)^2 & G(ky)^2 & B(ky)^2 \end{bmatrix} Y \quad \text{(Formula 13)}$$

Note that instead of the estimated spectral reflectance characteristics of each ink, the left sides of Formula 12 and Formula 13 may be spectral density characteristics obtained by logarithmic conversion of the spectral reflectance characteristics. Next, in step S1703, using the matrix Y described above, the first-order color characteristic calculation unit 4045 obtains the reflectances ($\rho\_c$, $\rho\_m$, $\rho\_y$) of each ink at the wavelength used in the ink color estimation for the color signal value of each ink as the first-order color characteristics 4046. The first-order color characteristic calculation unit 4045 calculates the first-order color characteristics 4046 of each head module or each nozzle. Furthermore, in step S1704, the target setting unit 408 determines the target characteristics 409 of each ink on the basis of the first-order color characteristics 4046. In step S1705, the correction table generation unit 406 generates the correction table 407 on the basis of the first-order color characteristics 4046 and the target characteristics 409.

The flow of printing an image by the user may be performed as per the flow illustrated in FIG. 11. However, in the present embodiment, the RGB values corresponding to the pixel position ($x_i$,$y_i$) of the image are obtained, rather than the spectral reflectance $\rho_x(x_i,y_i,\lambda)$ of each ink. Here, the reflectances of each ink ($\rho\_c$, $\rho\_m$, $\rho\_y$) at the wavelength used in the estimation of each ink color corresponding to the pixel position ($x_i$,$y_i$) is calculated by applying the above matrix Y to the obtained RGB values. After this, the correction table generation unit 406 generates the correction table 407 in the same manner as in step S1104, and stores the correction table 407 in the storage unit 105.

In the present embodiment, the matrix Y, which associates the reflectance of each ink at the wavelength used when estimating each ink color with a corresponding RGB value, is calculated. Note, however, that the present embodiment may use a matrix Z that associates the RGB values with virtual ink densities as indicated by the following Formula 14.

$$\begin{bmatrix} V_c & 0 & 0 \\ 0 & V_m & 0 \\ 0 & 0 & V_y \end{bmatrix} = \begin{bmatrix} R(kc) & G(kc) & B(kc) \\ R(km) & G(km) & B(km) \\ R(ky) & G(ky) & B(ky) \end{bmatrix} Z \quad \text{(Formula 14)}$$

Note that the target setting unit 408 sets the target characteristics 409 in common for the head module and nozzle, which are the units by which each ink color is corrected. The correction during the advance settings in step S706 and the correction during image printing by the user in step S1705 are performed using the common target characteristics 409. However, target characteristics 409 which differ from head module to head module or from nozzle to nozzle may be set. Alternatively, different target characteristics 409 may be set during the advance settings and during the image printing by the user. For example, the correction during the image printing by the user in step S1705 may be performed on the basis of the ink characteristics of each head module obtained as a result of reading the first image among the printed images. Images printed thereafter may then be corrected using the stated ink characteristics as the target characteristics. The correction processing unit 402 corrects the halftone dot ratio of each ink color CMYK present in the input image data. Note that the correction processing for tone conversion performed by the HT processing unit 403 on the basis of a threshold matrix of each instance of image data can have the same effect as the correction processing performed by the correction processing unit 402.

As described thus far, according to the third embodiment, a plurality of first spectral reflectances, a plurality of second spectral reflectances, and RGB values associated with each of a plurality of first halftone dots and a plurality of second halftone dots can be obtained in advance. According to the third embodiment, a conversion matrix can be provided that converts the RGB values associated with each of the plurality of first halftone dots and the plurality of second halftone dots into a plurality of first spectral reflectances and a plurality of second spectral reflectances, respectively. According to the third embodiment, the plurality of first spectral reflectances and the plurality of second spectral reflectances can be corrected on the basis of the obtained RGB values and a conversion matrix. Through this, the estimation time for estimating a recording amount for each of colors in an image containing a plurality of colors can be shortened, and the accuracy of color stabilization processing can be improved.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-027744, filed Feb. 24, 2021, which is hereby incorporated by reference herein in its entirety.

What is claimed is:

1. An image processing device comprising:
   an obtaining unit configured to obtain a mixed spectral reflectance of a region in which a first color and a second color are mixed in an image including the first color and the second color, a plurality of first spectral reflectances of the first color, a plurality of first halftone dots associated with respective ones of the plurality of first spectral reflectances, a plurality of second spectral reflectances of the second color, and a plurality of second halftone dots associated with respective ones of the plurality of second spectral reflectances;
   a determining unit configured to determine a first wavelength range in which the plurality of first spectral reflectances are lower than the plurality of second spectral reflectances and a second wavelength range in which the plurality of first spectral reflectances are higher than the plurality of second spectral reflectances;
   an estimation unit configured to estimate a first halftone dot associated with one first spectral reflectance, selected from the plurality of first spectral reflectances, in accordance with a matching rate with the mixed spectral reflectance in the first wavelength range, find a third spectral reflectance by dividing the mixed spectral reflectance by the first spectral reflectance selected, and estimate a second halftone dot associated with one second spectral reflectance, selected from the plurality of second spectral reflectances, in accordance with a matching rate with the third spectral reflectance in the second wavelength range; and
   a correcting unit configured to correct the first halftone dot and the second halftone dot of the first color and the second color, respectively, on the basis of a difference between a pre-set target for the first halftone dot and the second halftone dot and the first halftone dot and the second halftone dot estimated by the estimation unit, respectively.

2. The image processing device according to claim 1, wherein the determining unit determines the first wavelength range and the second wavelength range on the basis of whether a difference between the plurality of first spectral reflectances and the plurality of second spectral reflectances exceeds a threshold.

3. The image processing device according to claim 2, further comprising:
   a converting unit configured to convert the plurality of first spectral reflectances in a part of the first wavelength range into a plurality of first virtual spectral reflectances, convert the plurality of second spectral reflectances in part of the second wavelength range into a plurality of second virtual spectral reflectances, and convert the mixed spectral reflectance in part of the first wavelength range and part of the second wavelength range into a first mixed virtual reflectance and a second mixed virtual reflectance, respectively, using a conversion matrix that eliminates the plurality of second spectral reflectances in the first wavelength range and eliminates the plurality of first spectral reflectances in the second wavelength range when the determining unit determines that the difference between the plurality of first spectral reflectances and the plurality of second spectral reflectances does not exceed the threshold,
   wherein the estimation unit estimates a first halftone dot associated with one first virtual spectral reflectance, selected from the plurality of first virtual spectral reflectances, in accordance with a matching rate with the first mixed virtual reflectance in the first wavelength range, and estimates a second halftone dot associated with one second virtual spectral reflectance, selected from the plurality of second virtual spectral reflectances, in accordance with a matching rate with the second mixed virtual reflectance in the second wavelength range.

4. The image processing device according to claim 3, wherein the converting unit converts the mixed spectral reflectance, the plurality of first spectral reflectances, and the plurality of second spectral reflectances into a mixed spectral density, a plurality of first spectral densities, and a plurality of second spectral densities, respectively, and
   converts the mixed spectral density, the plurality of first spectral densities, and the plurality of second spectral densities into a mixed virtual spectral density, a plurality of first virtual spectral densities, and a plurality of second virtual spectral densities, respectively.

5. The image processing device according to claim 1, further comprising:
   a storage unit configured to store a sensitivity distribution determined on the basis of each of a threshold of a sensitivity of the plurality of first spectral reflectances of the first color and the plurality of second spectral reflectances of the second color for each of wavelength ranges; and
   a setting unit configured to set an estimation order of the first color and the second color, and an estimated wavelength including the first wavelength range for estimating the first color and the second wavelength range for estimating the second color, on the basis of a result of determining the sensitivity for each of the wavelength ranges using the sensitivity distribution.

6. The image processing device according to claim 5, wherein the storage unit stores the plurality of first spectral reflectances of the first color, the plurality of first halftone dots associated with respective ones of the plurality of first spectral reflectances, the plurality of second spectral reflectances of the second color, and the plurality of second halftone dots associated with respective ones of the plurality of second spectral reflectances.

7. The image processing device according to claim 3, wherein the obtaining unit obtains the plurality of first spectral reflectances, the plurality of second spectral reflectances, and RGB values associated with each of the plurality of first halftone dots and the plurality of second halftone dots,
   the converting unit includes a conversion matrix that converts the RGB values associated with each of the plurality of first halftone dots and the plurality of second halftone dots into the plurality of first spectral reflectances and the plurality of second spectral reflectances, respectively, and
   the correcting unit corrects the plurality of first spectral reflectances and the plurality of second spectral reflectances on the basis of the RGB values obtained by the obtaining unit and the conversion matrix.

8. The image processing device according to claim 1, further comprising:
an image forming unit including a head module having one of the first color or the second color, a chip module provided in the head module, and a nozzle provided in the chip module,
wherein the correcting unit corrects each of the first halftone dot and the second halftone dot of the image forming unit.

9. An image forming system comprising:
an image capturing apparatus; and
the image processing device according to claim 1.

10. An image processing method comprising:
obtaining a mixed spectral reflectance of a region in which a first color and a second color are mixed in an image including the first color and the second color, a plurality of first spectral reflectances of the first color, a plurality of first halftone dots associated with respective ones of the plurality of first spectral reflectances, a plurality of second spectral reflectances of the second color, and a plurality of second halftone dots associated with respective ones of the plurality of second spectral reflectances;
determining a first wavelength range in which the plurality of first spectral reflectances are lower than the plurality of second spectral reflectances and a second wavelength range in which the plurality of first spectral reflectances are higher than the plurality of second spectral reflectances;
estimating a first halftone dot associated with one first spectral reflectance, selected from the plurality of first spectral reflectances, in accordance with a matching rate with the mixed spectral reflectance in the first wavelength range, find a third spectral reflectance by dividing the mixed spectral reflectance by the first spectral reflectance selected, and estimate a second halftone dot associated with one second spectral reflectance, selected from the plurality of second spectral reflectances, in accordance with a matching rate with the third spectral reflectance in the second wavelength range; and
correcting the first halftone dot and the second halftone dot of the first color and the second color, respectively, on the basis of a difference between a pre-set target for the first halftone dot and the second halftone dot and the first halftone dot and the second halftone dot estimated by the estimating, respectively.

11. A non-transitory computer-readable storage medium storing a program that, when executed by a computer, causes the computer to perform an image processing method, the non-transitory computer-readable storage medium comprising:
obtaining a mixed spectral reflectance of a region in which a first color and a second color are mixed in an image including the first color and the second color, a plurality of first spectral reflectances of the first color, a plurality of first halftone dots associated with respective ones of the plurality of first spectral reflectances, a plurality of second spectral reflectances of the second color, and a plurality of second halftone dots associated with respective ones of the plurality of second spectral reflectances;
determining a first wavelength range in which the plurality of first spectral reflectances are lower than the plurality of second spectral reflectances and a second wavelength range in which the plurality of first spectral reflectances are higher than the plurality of second spectral reflectances;
estimating a first halftone dot associated with one first spectral reflectance, selected from the plurality of first spectral reflectances, in accordance with a matching rate with the mixed spectral reflectance in the first wavelength range, find a third spectral reflectance by dividing the mixed spectral reflectance by the first spectral reflectance selected, and estimate a second halftone dot associated with one second spectral reflectance, selected from the plurality of second spectral reflectances, in accordance with a matching rate with the third spectral reflectance in the second wavelength range; and
correcting the first halftone dot and the second halftone dot of the first color and the second color, respectively, on the basis of a difference between a pre-set target for the first halftone dot and the second halftone dot and the first halftone dot and the second halftone dot estimated by the estimating, respectively.

* * * * *